United States Patent
Harrang et al.

(10) Patent No.: US 9,143,341 B2
(45) Date of Patent: Sep. 22, 2015

(54) SYSTEMS AND METHODS FOR PORTABLE DATA STORAGE DEVICES THAT AUTOMATICALLY INITIATE DATA TRANSFERS UTILIZING HOST DEVICES

(75) Inventors: Jeffrey Paul Harrang, Sammammish, WA (US); David B. Gibbons, Redmond, WA (US); John M. Burnette, Seattle, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 321 days.

(21) Appl. No.: 12/614,426

(22) Filed: Nov. 8, 2009

(65) Prior Publication Data

US 2010/0121941 A1 May 13, 2010

Related U.S. Application Data

(60) Provisional application No. 61/112,361, filed on Nov. 7, 2008.

(51) Int. Cl.
*G06F 15/16* (2006.01)
*H04L 12/28* (2006.01)
(Continued)

(52) U.S. Cl.
CPC ............ *H04L 12/2812* (2013.01); *H04L 12/00* (2013.01); *H04L 67/141* (2013.01);
(Continued)

(58) Field of Classification Search
CPC ..... H04L 12/00; H04L 12/2812; H04L 67/34; H04L 67/141; H04L 67/12; H04L 67/14; H04L 67/16; H04L 29/06095
USPC ........................................................ 709/219
See application file for complete search history.

(56) References Cited

U.S. PATENT DOCUMENTS

| | | | |
|---|---|---|---|
| 650,243 | A | 5/1900 | Hart |
| 5,706,281 | A | 1/1998 | Hashimoto et al. |

(Continued)

FOREIGN PATENT DOCUMENTS

| | | |
|---|---|---|
| DE | 19831169 | 1/2000 |
| DE | 10208094 | 9/2003 |

(Continued)

OTHER PUBLICATIONS

VLC Portable Media Documentation, dated Nov. 14, 2006.*
(Continued)

*Primary Examiner* — Joseph Greene
(74) *Attorney, Agent, or Firm* — Davis Wright Tremaine LLP; Michael J. Donohue; Heather M. Colburn

(57) ABSTRACT

A computing system including a media content provider (MCP), a host device, a portable media content storage device (PMCSD), and a data communications network. In response to data communications being initiated between the PMCSD the host device, a data transfer application resident on the PMCSD is automatically executed to determine if any media content transfer instructions exist on the PMCSD or a MCP. The data transfer application resident on the PMCSD may be a portable application not requiring the installation of any configuration or support files to the host device or it may be an application having a boot process that installs configuration or support files to the host device prior to application execution. When one or more media content transfer instructions exists on the PMCSD or a MCP, the media content transfer instruction(s) is processed by the host device, to facilitate media content transfer between the PMCSD and the MCP.

18 Claims, 13 Drawing Sheets

(51) Int. Cl.
*H04L 12/00* (2006.01)
*G06F 15/173* (2006.01)
*H04L 29/08* (2006.01)

(52) U.S. Cl.
CPC ............. *H04L 67/34* (2013.01); *H04L 67/12* (2013.01); *H04L 67/14* (2013.01); *H04L 67/16* (2013.01); *H04L 2012/2841* (2013.01)

(56) References Cited

U.S. PATENT DOCUMENTS

| | | |
|---|---|---|
| 5,706,428 A | 1/1998 | Boer et al. |
| 5,726,978 A | 3/1998 | Frodigh et al. |
| 5,907,679 A * | 5/1999 | Hoang et al. ............. 709/220 |
| 5,974,460 A | 10/1999 | Maddalozzo et al. |
| 6,038,224 A | 3/2000 | Kim et al. |
| 6,052,734 A | 4/2000 | Ito |
| 6,311,065 B1 | 10/2001 | Ushiki et al. |
| 6,327,677 B1 | 12/2001 | Garg et al. |
| 6,339,785 B1 | 1/2002 | Feigenbaum |
| 6,377,805 B1 | 4/2002 | Anvekar et al. |
| 6,453,346 B1 | 9/2002 | Garg et al. |
| 6,493,875 B1 | 12/2002 | Eames et al. |
| 6,512,865 B1 | 1/2003 | Shen et al. |
| 6,529,476 B1 | 3/2003 | Magnussen |
| 6,560,243 B1 | 5/2003 | Mogul |
| 6,567,415 B1 | 5/2003 | Elwalid et al. |
| 6,622,172 B1 | 9/2003 | Tam |
| 6,651,105 B1 | 11/2003 | Bhagwat et al. |
| 6,778,826 B2 * | 8/2004 | Rankin ................. 455/433 |
| 6,804,702 B2 * | 10/2004 | Duroj ................. 709/215 |
| 6,807,429 B2 | 10/2004 | Subrahmanya |
| 6,845,398 B1 | 1/2005 | Galensky et al. |
| 6,910,078 B1 | 6/2005 | Raman et al. |
| 6,947,388 B1 | 9/2005 | Wagner |
| 7,035,634 B2 * | 4/2006 | Mead et al. ............ 455/431 |
| 7,058,723 B2 | 6/2006 | Wilson |
| 7,076,695 B2 | 7/2006 | McGee et al. |
| 7,085,576 B2 | 8/2006 | Ranganathan |
| 7,103,906 B1 | 9/2006 | Katz et al. |
| 7,240,099 B2 | 7/2007 | Miyazaki et al. |
| 7,349,337 B1 | 3/2008 | Mahdavi |
| 7,451,205 B2 | 11/2008 | Cheung et al. |
| 7,454,527 B2 | 11/2008 | Zhang et al. |
| 7,496,675 B2 | 2/2009 | Obata et al. |
| 7,512,066 B2 | 3/2009 | Santos et al. |
| 7,519,030 B2 | 4/2009 | Cimini et al. |
| 7,533,158 B2 | 5/2009 | Grannan et al. |
| 7,536,626 B2 | 5/2009 | Sutivong et al. |
| 7,539,752 B1 | 5/2009 | Chakravarti et al. |
| 7,543,052 B1 | 6/2009 | Cesa Klein |
| 7,568,045 B1 | 7/2009 | Agrawal |
| 7,577,908 B2 | 8/2009 | Frazier et al. |
| 7,594,260 B2 | 9/2009 | Porras et al. |
| 7,617,312 B2 | 11/2009 | Tummalapalli |
| 7,643,461 B2 | 1/2010 | Choi et al. |
| 7,650,111 B2 | 1/2010 | Dennisson et al. |
| 7,650,376 B1 | 1/2010 | Blumenau |
| 7,688,733 B1 | 3/2010 | Mirza |
| 7,698,416 B2 | 4/2010 | Potti et al. |
| 7,765,324 B2 | 7/2010 | Imiya |
| 7,769,903 B2 * | 8/2010 | Robbin et al. ............ 709/248 |
| 2002/0021465 A1 | 2/2002 | Moore |
| 2002/0069237 A1 | 6/2002 | Ehara |
| 2002/0081971 A1 | 6/2002 | Travostino |
| 2002/0116555 A1 | 8/2002 | Somers et al. |
| 2002/0156910 A1 | 10/2002 | Senda |
| 2002/0159396 A1 | 10/2002 | Carlson et al. |
| 2003/0014496 A1 | 1/2003 | Spencer et al. |
| 2003/0028890 A1 | 2/2003 | Swart et al. |
| 2003/0084182 A1 | 5/2003 | Mahiddini et al. |
| 2003/0099201 A1 | 5/2003 | Hu et al. |
| 2003/0145100 A1 | 7/2003 | Marchetto et al. |
| 2003/0174677 A1 | 9/2003 | Mantha |
| 2003/0204769 A1 | 10/2003 | Coughlin |
| 2003/0221008 A1 | 11/2003 | England et al. |
| 2004/0002362 A1 | 1/2004 | Chuah et al. |
| 2004/0003105 A1 | 1/2004 | Berzosa et al. |
| 2004/0015445 A1 | 1/2004 | Heaven et al. |
| 2004/0017788 A1 | 1/2004 | Shmueli et al. |
| 2004/0042398 A1 | 3/2004 | Peleg et al. |
| 2004/0066746 A1 | 4/2004 | Matsunaga |
| 2004/0083276 A1 | 4/2004 | Shiraga |
| 2004/0117459 A1 | 6/2004 | Fry |
| 2004/0122969 A1 | 6/2004 | Ameigeiras et al. |
| 2004/0143652 A1 | 7/2004 | Grannan et al. |
| 2004/0168052 A1 | 8/2004 | Clisham et al. |
| 2004/0218563 A1 | 11/2004 | Porter et al. |
| 2005/0058138 A1 | 3/2005 | Bucher et al. |
| 2005/0091395 A1 | 4/2005 | Harris et al. |
| 2005/0091398 A1 | 4/2005 | Roberts et al. |
| 2005/0128995 A1 | 6/2005 | Ott et al. |
| 2005/0132049 A1 | 6/2005 | Inoue et al. |
| 2005/0165948 A1 | 7/2005 | Hatime |
| 2005/0169184 A1 | 8/2005 | Murgatroyd et al. |
| 2005/0193069 A1 | 9/2005 | Brown et al. |
| 2005/0198680 A1 | 9/2005 | Baran et al. |
| 2005/0239412 A1 | 10/2005 | Kelz |
| 2005/0256926 A1 | 11/2005 | Muhonen et al. |
| 2005/0281270 A1 | 12/2005 | Kossi et al. |
| 2005/0281277 A1 | 12/2005 | Killian |
| 2005/0282500 A1 | 12/2005 | Wang et al. |
| 2005/0289630 A1 | 12/2005 | Andrews |
| 2006/0019665 A1 | 1/2006 | Aghvami et al. |
| 2006/0025151 A1 | 2/2006 | Karaoguz et al. |
| 2006/0026296 A1 | 2/2006 | Nagaraj |
| 2006/0150055 A1 | 7/2006 | Quinard et al. |
| 2006/0176824 A1 | 8/2006 | Laver et al. |
| 2006/0268336 A1 | 11/2006 | Sakaniwa et al. |
| 2006/0277277 A1 | 12/2006 | Landschaft et al. |
| 2006/0282856 A1 | 12/2006 | Errico et al. |
| 2007/0025301 A1 | 2/2007 | Petersson et al. |
| 2007/0066297 A1 | 3/2007 | Jeidari-Bateni |
| 2007/0078899 A1 * | 4/2007 | Gulin et al. ............. 707/200 |
| 2007/0083588 A1 * | 4/2007 | Keller et al. ............ 709/202 |
| 2007/0086347 A1 | 4/2007 | Reynolds |
| 2007/0142067 A1 | 6/2007 | Cheng et al. |
| 2007/0165732 A1 | 7/2007 | Gerlach |
| 2007/0211674 A1 | 9/2007 | Ragnar Karlberg et al. |
| 2007/0239695 A1 | 10/2007 | Chakra et al. |
| 2008/0126919 A1 | 5/2008 | Uskali |
| 2008/0161951 A1 | 7/2008 | Morris |
| 2008/0162403 A1 | 7/2008 | Sundaresan |
| 2008/0165693 A1 | 7/2008 | Castro et al. |
| 2008/0195745 A1 | 8/2008 | Bowra et al. |
| 2008/0205291 A1 | 8/2008 | Li et al. |
| 2008/0208963 A1 | 8/2008 | Eyal et al. |
| 2008/0212509 A1 | 9/2008 | Kim et al. |
| 2008/0215873 A1 | 9/2008 | Bobrow |
| 2008/0256272 A1 | 10/2008 | Kampmann et al. |
| 2008/0263240 A1 * | 10/2008 | Kori et al. ............. 710/58 |
| 2008/0319833 A1 | 12/2008 | Svendsen |
| 2009/0100469 A1 | 4/2009 | Conradt et al. |
| 2009/0164624 A1 | 6/2009 | Metcalf et al. |
| 2009/0164646 A1 | 6/2009 | Christian et al. |
| 2009/0327512 A1 | 12/2009 | Chapweske |
| 2010/0198943 A1 | 8/2010 | Harrang et al. |
| 2011/0149730 A1 * | 6/2011 | Nemeth et al. ............ 370/234 |

FOREIGN PATENT DOCUMENTS

| | | |
|---|---|---|
| EP | 1587290 | 10/2005 |
| EP | 1622385 A1 | 1/2006 |
| EP | 1715403 | 10/2006 |
| EP | 1715403 A1 | 10/2006 |
| EP | 1841172 | 10/2007 |
| EP | 2214401 A1 | 4/2010 |
| EP | 2214401 | 8/2010 |
| JP | 07336375 | 12/1995 |
| JP | 10124412 | 5/1998 |
| JP | 2005258912 | 9/2005 |
| KR | 102002-0017926 | 3/2002 |
| KR | 20020017926 | 3/2002 |
| KR | 102004-0028401 | 4/2004 |

(56) References Cited

FOREIGN PATENT DOCUMENTS

| KR | 20040028401 | 4/2004 |
| KR | 100438697 | 7/2004 |
| KR | 100645742 | 11/2006 |
| KR | 10-20070013600 | 1/2007 |
| KR | 1020070011811 | 1/2007 |
| KR | 100693023 B1 | 3/2007 |
| KR | 20070053884 | 5/2007 |
| KR | 102007-0117197 | 12/2007 |
| KR | 100807264 B1 | 2/2008 |
| KR | 102008-0039324 | 5/2008 |
| WO | WO 9320637 | 10/1993 |
| WO | WO 0247414 | 6/2002 |
| WO | WO 2004114639 | 12/2004 |
| WO | WO 2005120122 | 12/2005 |
| WO | WO 2006099545 | 9/2006 |

OTHER PUBLICATIONS

European Patent Office; European Search Report May 2, 2012; The Hague.

\* cited by examiner

SYSTEMS AND METHODS FOR PORTABLE DATA STORAGE DEVICES THAT AUTOMATICALLY INITIATE DATA TRANSFERS UTILIZING HOST DEVICES

CROSS REFERENCE TO RELATED APPLICATIONS

The present application claims the benefit of U.S. Provisional Application No. 61/112,361, filed Nov. 7, 2008.

FIELD OF THE INVENTION

The present invention generally relates to systems and methods for automatically initiating managed media content transfers utilizing portable data storage devices. These portable data storage devices have readily bootable data transfer applications stored in their local memory that can be automatically executed in response to a detection of a triggering event, such as a device plug-in event or a short-range wireless communications activation event. New or pending media content transfer sessions may be automatically or selectively launched by executing the data transfer application resident on a portable data storage device.

BACKGROUND OF THE INVENTION

Digital media content distribution services continue to grow at an astonishing rate in response to the evolution of modern data communications networks that can facilitate high-speed data transfers for vast amounts of digital media content data. Whether digital media content distribution occurs over wireline networks, such as fiber-optic or cable networks, or over wireless networks, such as 3G, 3GPP LTE, LTE Advanced, or 4G cellular networks, the trend of increasing distribution service capacity and flexibility remains a key objective for most media content service providers. Over the past decade, consumer exposure to state-of-the-art digital media content distribution and playback technologies (e.g., digital video recorders (DVRs), multi-function cellular phones, PDAs, satellite radio and television devices, e-books devices, etc.) has created a significant demand for improved digital media content delivery services.

These new technologies have revolutionized the way consumers procure and utilize a wide variety of digital media content. A non-exhaustive listing of modern digital media content types, include: movies, TV programs, home video, software applications, video games, podcasts, music, e-books, etc. Most distribution services for these media content types occur over the Internet at media content provider website stores (e.g., Apple® I-Tunes™, Microsoft® Zune™, and Amazon® Kindle™ Stores) or over proprietary cable, fiber-optic, satellite, and cellular networks provided by various media content services providers (e.g., Comcast® Digital Cable, Verizon® FIOS™, DirectTV®, Sirius® XM Radio™, and AT&T® Wireless).

Many popular digital distribution services allow consumers to select and download digitized media content files to personal computers or set-top boxes where they can later be manually selected for upload to a variety of portable media playback devices to facilitate future media content playback. These autonomous playback devices free consumers from having to remain connected to a particular communications network in order to enjoy their digital media content. Most popular media playback devices (e.g., the Apple® I-Phone™ and I-Pod™, or the Amazon® Kindle™) are provided with many Gigabytes of non-volatile memory (e.g., Flash Memory) that allows the playback devices to maintain local repositories for significant amounts of purchased, or otherwise acquired, digital media content.

In order to facilitate digital media content acquisition and autonomous playback on portable media content playback devices, users having the playback devices have typically followed the same common three-step model:

1) Select one or more digital media content files to download from a media content distribution service provider (also referred to herein as a Media Content Provider or MCP);
2) Initiate download of selected digital media content files to a powerful personal computing device, such as a desktop or laptop computer; and
3) Manually select downloaded digital media content files from the personal computing device to upload to a portable media content playback device.

By way of example, one very popular media content distribution service that follows the above three-step model is the Apple's® I-Tunes™ application integrated with the online I-Tunes™ Store. A user having an I-Phone™ or an I-Pod™ device can execute their local I-Tunes™ application, resident on a personal desktop or laptop computer, and then elect to connect their I-Tunes™ application to the I-Tunes™ Store via the Internet. Once connected to the I-Tunes™ Store, a user can then utilize their integrated I-Tunes™ application's user interface to 1) Select one or more digital media content files to download to their desktop or laptop computer.

As would be understood by those familiar with the I-Tunes™ products and services, when the local I-Tunes™ application is connected with the I-Tunes™ Store, the interface of the I-Tunes™ application is integrated with the I-Tunes™ Store website interface, such that a user can view a web-based catalog of downloadable digital media content through their local I-Tunes™ application interface. The Apple® I-Tunes™ Store generally distributes media content relating to: digitized music, movies, podcasts, games, software applications, audiobooks, e-books, etc. After selection of various digital media content, a user can then purchase the media content directly from the I-Tunes™ Store using a credit card or other payment method, and 2) Initiate downloading of the purchased digital media content to their desktop or laptop computer memory using the integrated I-Tunes™ interface.

When the digital media content has finished downloading to a user's desktop or laptop computer, the user is then able to selectively generate a personal library of procured media content for upload to their I-Phone™ or I-Pod™ device. Next, a user can connect their I-Phone™ or I-Pod™ device to their desktop or laptop computer (e.g., via USB cable) in order to Synchronize their portable playback device with the I-Tunes™ application. Subsequently, a user is able to 3) Manually upload the selected digital media content (their upload library) from their desktop or laptop computer to their connected I-Phone™ or I-Pod™ device utilizing the I-Tunes™ application interface.

The I-Tunes™ service is an elucidating example of the common three-step media content distribution model, which emphasizes a number of inherent procedural deficiencies associated with modern media content distribution services. One weakness of the three-step model is that user input and management of media content distribution is required at every step of the process in order to initiate media content transfers amongst the media content provider, the personal home computer (e.g., a desktop or laptop computer), and the end-receiving portable media content playback devices. Unfortunately, consumers who utilize this model need to be reasonably tech-savvy in order to properly navigate (and optionally transform) their purchased media content from online source to portable playback destination.

For example, in order to acquire digital media content on their portable playback devices, consumers are typically required to be able to do all of the following: log on to a media content provider store; select compatible media content for purchase; purchase the selected media content; designate a local destination address on their home computer (e.g., on their desktop or laptop computer) where the media content is to be stored; initiate the media content download; connect their portable playback device to their home computer storing the downloaded media content; select their home computer's media content source location, where the downloaded media content resides; optionally, reformat the media content to be compatible with a particular playback device; select the attached playback device as the recipient device for a media content upload; and initiate the upload from their home computer to their portable playback device.

For many tech-savvy consumers these media content procurement and distribution procedures are not very difficult, however, for large numbers of consumers who are not very computer-literate, these procedures can be daunting or even prohibitive. Accordingly, large populations of potential consumers, having lower levels of computer literacy, are deterred from entering the digital media distribution marketplace because of the required technology aptitude and the relative complexity of most modern media content distribution services. These individuals often continue to purchase more expensive physical playback media (e.g., DVDs or CDs) that can be easily inserted into simple, dated playback devices (e.g., DVD or CD players) that only require one playback step after medium insertion: hitting a "play" button on a playback device.

Another shortcoming associated with modern digital media content distribution services is that there are inherent network limitations created by allowing consumers to selectively determine during which periods of time media content transfers should occur. The communications networks involved in the data transfers are necessarily sized to handle peak usage data transfer periods for the network's collective users. These peak usage periods are determined by aggregate network user behaviors over hourly, daily, monthly, and yearly intervals. When large numbers of network users simultaneously transfer particularly burdensome media content files, such as high definition audiovisual files, networks can become congested. This congestion can negatively affect cumulative network throughput as well as the Quality of Service (QOS) and the Quality of Experience (QOE) for most network users.

To remedy the problems associated congestion and the lack of network capacity (e.g., available network bandwidth) during peak usage periods of operation, network service providers often commit to expensive, time-consuming technology additions and/or upgrades. These network enhancements serve to alleviate network congestion periods and to avoid persistent customer service calls from irritated customers.

Even though certain networks routinely experience periods of extreme congestion during peak usage data transfer periods, these same networks often experience periods of excess, wasted bandwidth during off-peak data transfer periods. Although, costly network enhancements can alleviate peak periods of congestion in most networks, these enhancements also create an increased surplus of wasted bandwidth during off-peak periods. It is therefore advantageous to consider new ways to utilize existing network resources in order to efficiently balance daily bandwidth usage over a data communications network routinely experiencing network congestion, and to avoid unnecessarily expending service provider resources.

Another drawback with modern digital media content distribution services is getting the media content (e.g., pixel-based video content having resolutions associated with set aspect ratios) to properly display on desired playback devices, such as large-format, high-definition televisions or home theaters. Generally, if an original media content is downloaded from a media content provider to a personal desktop or laptop computer in a consumer's home or office, then the media content will likely need to be reformatted and uploaded (e.g., via direct connection with a USB cable or via a local wireless area network, such as a Wi-Fi™ network) to one or more portable playback devices in order to be properly displayed on the end playback devices.

To date, there have been several attempted solutions to this local media content reformatting and redistribution problem, including: relocating personal desktop computers from a home office to a television room (e.g., a living room) in order to facilitate local reformatting through direct connection with both portable and non-portable playback devices, along with facilitating wireless (e.g., via a local Wi-Fi™ network) home redistribution of re-formatted media content. Unfortunately, these attempted solutions each have inherent drawbacks and added complexity (particularly for individuals having low computer literacy) that has limited consumer acceptance and adoption of these techniques. Problems may further be compounded if a consumer attempts to take their digital media content with them during travel, to continue watching or listening to particular media content as they change locations and switch amongst different media playback devices. Under these scenarios, it becomes exponentially more difficult for non tech-savvy users to enjoy their media content in varying settings employing an assortment of different playback devices.

Another problem with modern digital media content distribution services is that data transfer processes are tied to particular physical locations where intermediary desktop or laptop computers reside (e.g., computers running local media content distribution client software, such as the Apple® I-Tunes™ application). In these static settings, a designated access network may often be disrupted by connection failures, timeouts, or relocation of network attachment points for a download destination device. As digital media content file transfer sessions become increasingly burdensome (e.g., media content files become increasingly large), the frequency and periods for these potential disruptions can stretch over hours or even days. One method of handling this problem over select networks (e.g., cellular networks) has been to restrict a media content transfer file size (and therefore quality) to a size that a particular access network can handle in a tractable time period (e.g., complete file transfers within a few hours). This approach not only limits the quality of the media content that can be delivered to consumers, but it also limits the number of consumers that are even be able to acquire desired media content types.

Accordingly, it would be advantageous to have improved digital media content distribution systems and services that simplified a user's experience in procuring and enjoying digital media content. It would be beneficial if these solutions offered the less tech-savvy consumer a practical means for flexibly obtaining digital media content in response to simple system detection events, such as a device plug-in event or an automatic wireless communications activation event. Further, it would be desirable if these solutions were highly portable and dynamic in nature, such that a user could readily switch media content delivery tasks between various personal computing devices and both media content delivery and playback functionality could be realized at local and remote locations. Additionally, it would be beneficial if these solutions were implemented to maximize available network resources at any given time, such that media content delivery scheduling could be directed towards periods of excess network bandwidth. Having flexible, mobile digital media content distribution solutions would cater to the needs of residential and commercial consumers, including consumers who frequently travel (highly mobile consumers) along with network service providers who wish to maximize their network's available resources.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with existing media content distribution systems, the present invention discloses a networked computing system for automatically initiating and controlling the distribution of various media content. In accordance with an exemplary embodiment of the invention, the networked computing system includes: one or more media content provider (MCP), one or more host device, a portable media content storage device (PMCSD), and a data communications network facilitating data communications amongst all computing devices within the networked computing system. In response to data communications (e.g., wireline or short-range wireless data communications) being initiated between the PMCSD and a host device, a data transfer application resident on the PMCSD may be automatically executed to determine if any media content transfer instructions exist on the PMCSD or a MCP (e.g., a remote MCP offering a media content distribution service).

In accordance with one aspect of the present invention, the data transfer application resident on the PMCSD may be a portable application that can be executed by the host device without needing to install any data transfer application configuration or support files to the host device.

In accordance with another aspect of the present invention, the data transfer application resident on the PMCSD may include a boot component that installs temporary data transfer software files to the host device before the data transfer application is executed by the host device, and when the data transfer application execution is stopped, the data transfer configuration or support files may be removed from the host device.

In accordance with a further aspect of the present invention, when the executed data transfer application determines that there are one or more media content transfer instruction on the PMCSD or a MCP, the media content transfer instruction(s) is processed by the host device, such that a portion of one or more media content may be transferred between the PMCSD and the MCP.

In accordance with yet a further aspect of the present invention, one or more media content may be uploaded from the PMCSD to the MCP in response to the processed media content transfer instruction(s), and the MCP may then selectively distribute a portion of the uploaded media content to one or more end receiving device of the networked computing system.

In accordance with another aspect of the present invention, a portion of one or more media content may be downloaded from the MCP to the PMCSD in response to the processed media content transfer instruction(s).

In accordance with yet another aspect of the invention, a computer-readable medium encoded with a set of computer-executable instructions, for initiating and controlling the distribution of various media content, may be executed to perform the following method, including: initiating data communications between a portable media content storage device (PMCSD) and a host device, automatically executing a data transfer application resident on the PMCSD in response to the initiated data communications, and determining with the data transfer application if any media content transfer instructions exist on the PMCSD or on a media content provider (MCP).

In accordance with a further aspect of the present invention, a computer-executable method for initiating and controlling the distribution of various media content, may include: initiating data communications between a portable media content storage device (PMCSD) and a host device, automatically executing a data transfer application resident on the PMCSD in response to the initiated data communications, and determining with the data transfer application if any media content transfer instructions exist on the PMCSD or on a media content provider (MCP).

In accordance with another aspect of the invention, a portable media content storage device (PMCSD) includes: one or more processor, one or more memory with a resident data transfer application, and a data communications interface facilitating communications between the PMCSD and an external computing device. In response to data communications being initiated between the PMCSD and an external computing device, the resident data transfer application may be automatically executed to determine if any media content transfer instructions exist that designate a portion of PMCSD memory as a source or a destination location for a portion of media content in queue for transfer.

In accordance with yet another aspect of the present invention, when the executed resident data transfer application determines that the PMCSD is a destination for a portion of media content in queue for transfer, the PMCSD communicates with a media content source, using a communications capability of the external computing device, to schedule a media content delivery for a portion of the media content in queue for transfer to the PMCSD.

BRIEF DESCRIPTION OF THE DRAWINGS

Preferred and alternative examples of the present invention are described in detail below with reference to the following Figure drawings.

DETAILED DESCRIPTION

Figure 1:
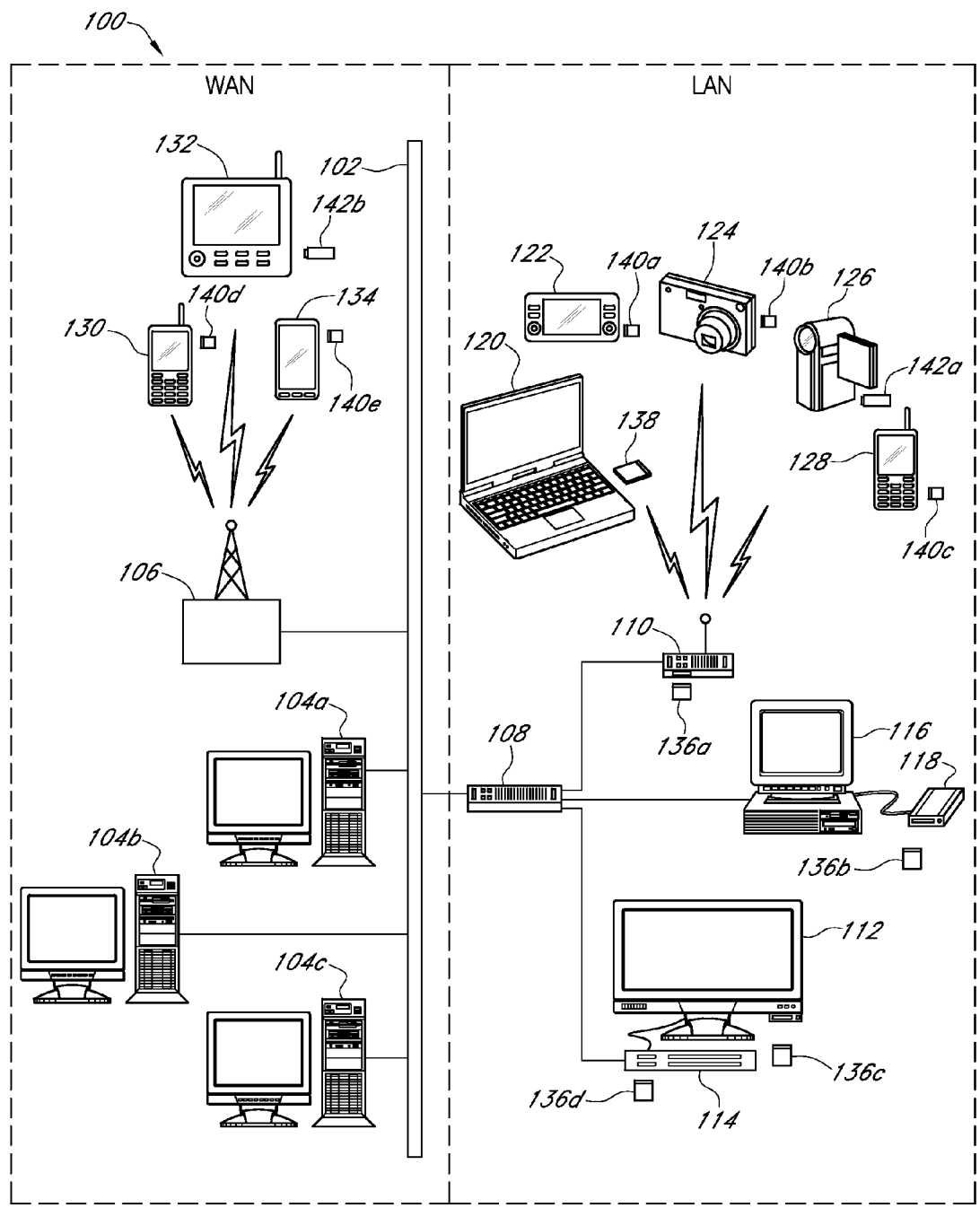
FIG. 1 illustrates a perspective view of a media content distribution system in accordance with an embodiment of the present invention.

In accordance with an exemplary embodiment of the present invention, FIG. 1 illustrates a networked computing system 100 including various wireline and wireless computing devices that may be utilized to implement any of the digital media content procurement and distribution processes associated with various embodiments of the present invention. The networked computing system 100 may include, but is not limited to, a group of remote server devices 104a-c, any one of which may be associated with various Media Content Providers (MCPs) that can provide digital media content distribution services to various networked clientele devices; a data communications network 102 (including both Wide Area Network (WAN) and Local Area Network (LAN) portions); a variety of remote wireless communications devices, including a cellular phone 130, an electronic book device 132, and a PDA device 134, that may be connected to the data communications network 102 utilizing one or more wireless basestation 106 or any other common wireless or wireline network communications technology; one or more network gateway or switch devices 108 that can facilitate data communications processes within the LAN and between the LAN and the WAN of the data communications network 102; a television device 112 (e.g., a high definition LCD or Plasma television, optionally including a media card-reader element) that is connected to a multi-media device 114 (e.g., such as a set-top box, digital video recorder (DVR), Blu-Ray™ player, and/or a digital video disk (DVD) player/recorder device, optionally including a card-reader element); a desktop computer 116 connected to an external card-reader/hard-drive device 118; a wireless router 110 (optionally including a card-reader device) that may communicate with various wireless LAN devices using any common local wireless communications technology, such as Wi-Fi™ or unshielded twisted pair cable; a wireless laptop computer 120; a wireless handheld gaming unit 122; a digital camera 124; a digital video recorder 126; a cellular phone device 128; and a variety or Portable Media Content Storage Devices (PMCSDs), including, but not limited to: Secure Disk cards (SD cards) 140a-e, Universal Serial Bus flash drives (USB drives) 142a-b, compact flash drives 136a-d, integrated PC cards 138, etc.

In various embodiments of the invention, any of the LAN connected computing devices (e.g., any of the network gateway device 108, wireless router 110, television 112, multimedia device 114, desktop computer 116, external card-reader/hard drive device 118, wireless laptop computer 120, wireless handheld gaming unit 122, digital camera 124, digital video recorder 126, or cellular phone device 128) as well as any of the remote wireless communications devices (e.g., any of the cellular phone device 130, electronic book device 132, or PDA device 134) of the networked computing system 100 may act as a host device (also referred to herein as a Host Computing Device or HCD) for any of the above mentioned PMCSD types (140a-e, 142a-b, 136a-d, or 138). As would be understood by those skilled in the art, a HCD for a memory/storage device, such as a PMCSD, is readily able to read data from the memory device and write data to the memory device.

In embodiments where a memory device has no independent power source (a case common for plug-in type memory devices having flash memory), a HCD is able to supply power/voltage to the memory device when the HCD and the memory device are connected. In other embodiments, where the memory device has wireless communications capabilities (e.g., having either Bluetooth™ or Wi-Fi™ communications transceivers), the memory device may have its own power source to facilitate short-range wireless communications with a HCD, also having wireless communications capabilities. In accordance with other embodiments, it may also be possible for a plug-in type memory device to have a rechargeable power source along with wireless communications capabilities. In this embodiment, the memory device could operate as both a plug-in type memory and a memory with wireless communications capabilities.

In an embodiment, any of the PMCSDs (140a-e, 142a-b, 136a-d, or 138) may act as add-on, plug-in or wireless (e.g., Wi-Fi™ or Bluetooth™ enabled) memory components for any of the LAN connected computing devices (108, 110, 112, 114, 116, 118, 120, 122, 124, 126, or 128) or any of the remote wireless communications devices (130, 132, or 134). As will be discussed further herein, a "plug-in event" may be defined as an action associated with physically connecting any of the PMCSDs (140a-e, 142a-b, 136a-d, or 138) with any of the local or remote data communications network 102 computing devices (108, 110, 112, 114, 116, 118, 120, 122, 124, 126, 128, 130, 132, or 134). A "plug-out event" may be defined as an action associated with physically disconnecting any of the PMCSDs (140a-e, 142a-b, 136a-d, or 138) from any of the local or remote data communications network 102 computing devices (108, 110, 112, 114, 116, 118, 120, 122, 124, 126, 128, 130, 132, or 134). A "wireless communications initiation event" may be defined as any action associated with wirelessly connecting (e.g., via short-range Wi-Fi™ or Bluetooth™ communications technologies) any of the PMCSDs (140a-e, 142a-b, 136a-d, or 138) with any of the local or remote data communications network 102 computing devices (108, 110, 112, 114, 116, 118, 120, 122, 124, 126, 128, 130, 132, or 134). A "wireless communications cessation event" may be defined as any action associated with wirelessly disconnecting any of the PMCSDs (140a-e, 142a-b, 136a-d, or 138) from any of the local or remote data communications network 102 computing devices (108, 110, 112, 114, 116, 118, 120, 122, 124, 126, 128, 130, 132, or 134).

As will be discussed further herein, the media transfer management functionality associated with the Media Transfer Manager (MTM) applications (e.g., 248 of FIG. 2) of any of the PMCSDs (140a-e, 142a-b, 136a-d, or 138) of the present invention may consist of download client and/or upload client processes. These processes can allow media content to be downloaded from one or more sending devices to a particular PMCSD receiving device, or to be uploaded from a sending PMCSD device to one or more end receiving devices. Practical applications employing these differing embodiments will be made apparent herein. In accordance with various embodiments of the present invention, a PMCSD resident MTM application 248 may be automatically booted and executed in response to either a plug-in event or a wireless communications initiation event.

In an embodiment, the remote server devices 104a-c, the wireless basestation 106, the remote wireless communications devices (130, 132, or 134), and any of the LAN connected computing devices (108, 110, 112, 114, 116, 118, 120, 122, 124, 126, or 128) may be configured to run any known operating system, including but not limited to, Microsoft Windows™, Mac OS™, Linux™, Unix™, or any common mobile operating system, including Symbian™, Palm™, Windows Mobile™, Mobile Linux™, MXI™, etc. In an embodiment, the remote server devices 104a-c and the wireless basestation 106 may employ any number of common server, desktop, laptop, and personal computing devices. In an embodiment, the remote wireless communications devices (130, 132, or 134) and the LAN connected computing devices (110, 112, 114, 116, 118, 120, 122, 124, 126, or 128) may include any combination of common mobile computing devices (e.g., laptop computers, netbook computers, cellular phones, PDAs, gaming portable units, digital cameras, digital video recorders, e-book devices, personal music player devices, etc.), having wireless communications capabilities employing any common wireless data commutations technology, including, but not limited to: Bluetooth™, Wi-Fi™, Wi-Max™, GSM™, UMTS™, etc.

In an embodiment, either of the LAN or the WAN portions of the data communications network 102 of FIG. 1 may employ, but are not limited to, any of the following common communications technologies: optical fiber, coaxial cable, twisted pair cable, Ethernet cable, and power line cable, along with any wireless communication technology known in the art. In an embodiment, any of the remote server devices 104a-c, the wireless basestation 106, the LAN connected computing devices (108, 110, 112, 114, 116, 118, 120, 122, 124, 126, or 128), or the remote wireless communications devices (130, 132, or 134) may include any standard computing software and hardware necessary for processing, storing, and communicating data amongst each other within the networked computing system 100. The computing hardware realized in any of the data communications network 102 computing devices (108, 110, 112, 114, 116, 118, 120, 122, 124, 126, 128, 130, 132 and 134) may include, but is not limited to, one or more processors, volatile and non-volatile memories, user interfaces, transcoders, and wireline and/or wireless communications transceivers, etc.

In an embodiment, any of the LAN-connected computing devices (108, 110, 112, 114, 116, 118, 120, 122, 124, 126, or 128) or the remote wireless communications devices (130, 132, or 134), may be configured to include one or more computer-readable media (e.g., any common volatile or non-volatile memory type) encoded with a set of computer readable instructions, which when executed, performs a portion of one or more of the digital media content procurement and distribution processes of the present invention.

Figure 2:
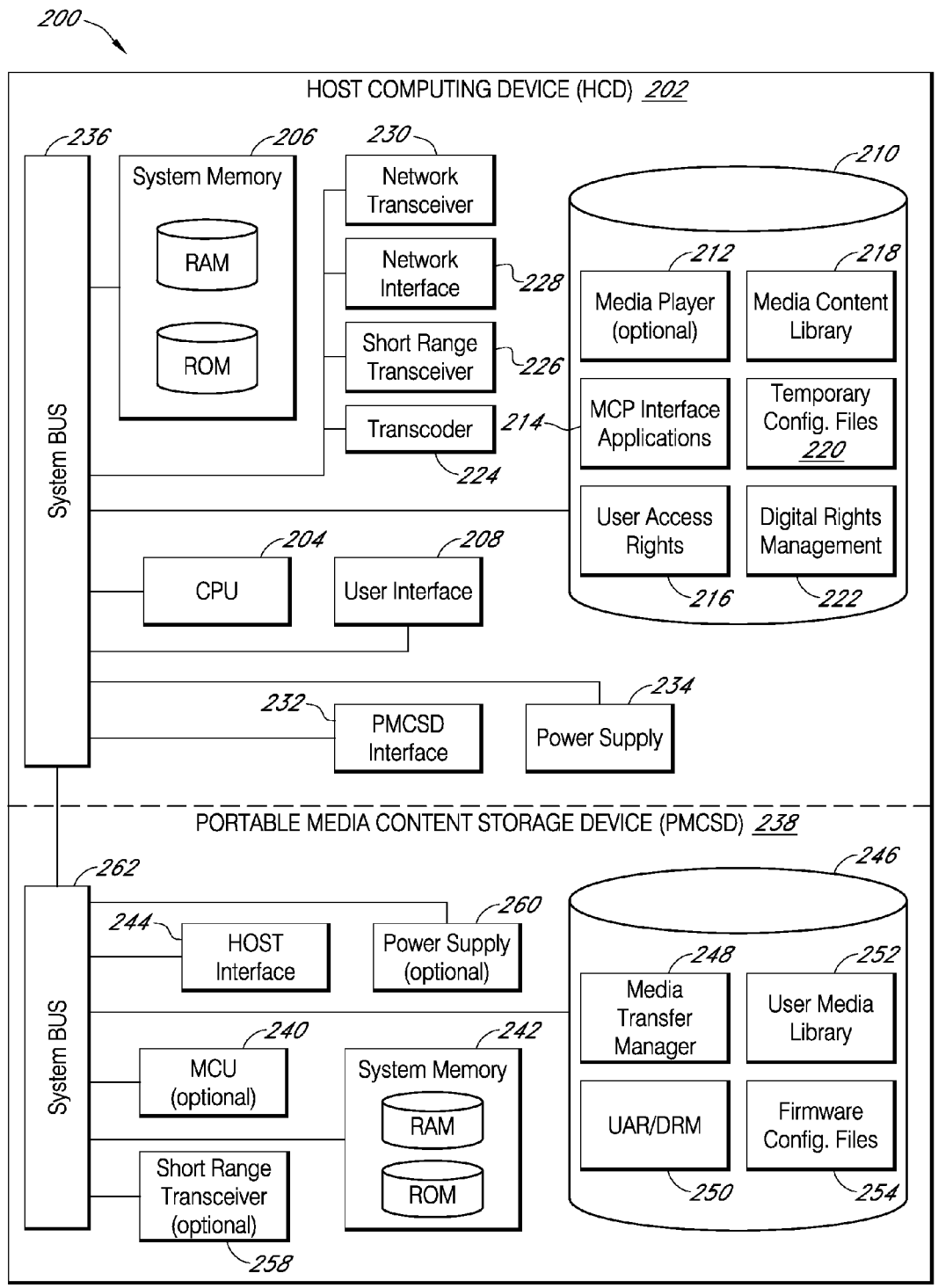
FIG. 2 illustrates a block diagram of a Host Computing Device (HCD) connected to a Portable Media Content Storage Device (PMCSD) in accordance with an embodiment of the present invention.

FIG. 2 shows a block diagram 200 view of a Host Computing Device (HCD) 202 physically joined with a Portable Media Content Storage Device (PMCSD) 238 in accordance with an embodiment of the present invention. In various embodiments, the HCD 202 may be representative of any of the LAN connected computing devices (108, 110, 112, 114, 116, 118, 120, 122, 124, 126, or 128) or the remote wireless communications devices (130, 132, or 134) in FIG. 1 of the present invention. In various embodiments, the PMCSD 238 may be representative of any of the PMCSDs (140a-e, 142a-b, 136a-d, or 138) in FIG. 1 of the present invention.

In an embodiment the HCD 202 may include, but is not limited to, one or more processor devices including a central processing unit (CPU) 204. In an embodiment, the CPU 204 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 204 is responsible for executing all computer programs stored on the HCD's 202 volatile (RAM) and nonvolatile (ROM) system memories 206, 210. The HCD 202 may also include, but is not limited to, a user interface 208 that allows a user to interact with the HCD's 202 software and hardware resources. The HCD 202 further includes a system database 210 that includes: an optional media player application 212, facilitating media content playback on the HCD 202; MCP Interface applications 214 that may be optionally integrated with a MCP website interface to allow a user to select media content for download from or upload to a MCP server location (e.g., a network location associated with any of remote server devices 104a-c of FIG. 1); a Media Content Library 218 that includes a user's downloaded, or otherwise acquired, digital media content (e.g., digital movies, TV programs, home video, software applications, video games, music, e-books, etc.); Application Configurations files and Temporary files 220; along with User Access Rights (UAR) information 216 and Digital Rights Management (DRM) information 222 that may include information pertaining to: secure identification of registered users (e.g., username, password, and associated account information), each registered user's rights to access various system resources and media content (e.g., access to various repositories and copyrighted media content, such as media stored in the Media Content Library 218).

As would be understood by those skilled in the art, a DRM system is a system that protects copyrighted media content data that is circulated over the Internet or any other digital medium, by enabling secure distribution of proprietary media content data. Typically, a DRM system protects copyrighted media content data by either encrypting or digitally watermarking it in such a way that only an intended recipient can intercept, decrypt, and utilize the media content data. In this way, DRM technology can ensure that copyrighted media content will not be freely distributed to unauthorized users.

In an embodiment the HCD 202 may also include: a PMCSD Interface 232 allowing the HCD 202 communicate directly with one or more PMCSD types (e.g., 140a-e, 142a-b, 136a-d, or 138); a power supply 234; a Network transceiver 230 and a Network Interface 228 that allow the HCD 202 to communicate across the LAN and WAN portions of the data communications network 102 of FIG. 1; an optional short-range transceiver 226 (e.g., a Bluetooth™ or a Wi-Fi™ enabled communications transceiver) that allows the HCD 202 to wirelessly communicate with one or more PMCSD types; a transcoder 224; and a system bus 236 that facilitates data communications amongst all the hardware resources of the HCD 202.

It should be understood that transcoders, as discussed in the present application, are generally directed to digital-to-digital conversion from one image format to another. Transcoding is usually performed on incompatible media content in order to transform the media content into a more suitable format for proper display or output at an end user playback device (e.g., display in accordance with a receiving device's capabilities). Some of these image formats have properties associated with: image resolution, image size and scale, image color depth and intensity, data compression, data encoding and decoding, etc. In accordance with various embodiments of the present invention, the HCD 202 transcoder 224 is capable of reformatting a received media content or a stored media content (e.g., media content stored in the Media Content Library 218) to be compatible with any of the local or remote media playback devices depicted in FIG. 1 having defined display capabilities (e.g., any of playback devices 112, 116, 120, 122, 124, 126, 128, 130, 132, and 134). Generally, this requires downloaded media content to be delivered in a fairly high-resolution format suitable for playback on a particular user's highest resolution media playback device (e.g., a 1080p LCD television device 112). For redistribution to other local, low-resolution media playback devices (e.g., a laptop computer 120), the downloaded data would transformed at the transcoder in accordance with various common downsampling and downsizing techniques.

In an embodiment the PMCSD 238 may include, but is not limited to, one or more optional microcontroller unit (MCU) 240 that may be responsible for controlling all the simple resident application input/output and storage assignment processes for the PMCSD device 238; system memory including volatile (RAM) and nonvolatile (ROM) system memories 242, 246; a system database 246 that includes: a resident Media Transfer Manger (MTM) application 248 having both download and upload client components, which may be executed by an external computing device; UAR and DRM information 250 that may include information pertaining to secure identification of registered users as well as each registered user's rights to access various media content (e.g., access to various repositories and copyrighted media content, such as media stored as local or remote proprietary media libraries); a User Media Library 252 that may include a variety of downloaded, or otherwise acquired, digital media content (e.g., digital movies, TV programs, home video, software applications, video games, music, e-books, etc.); and Firmware Configuration Files (including support files) 254 that may be required to initiate the resident MTM application 248; a Host Interface 244 allowing the PMCSD 238 to communicate directly with one or more HCD types (e.g., 108, 110, 112, 114, 116, 118, 120, 122, 124, 126, 128, 130, 132, or 134); an optional power supply 260; as well as an optional short-range transceiver 258 (e.g., a Bluetooth™ or a Wi-Fi™ enabled communications transceiver) that facilitates the PMCSD 238 communicating with a HCD 202 via a local wireless link; and a system bus 262 that facilitates data communications amongst all the hardware resources of the PMCSD 238.

In accordance with one embodiment of the present invention, the MTM application 248 resident on the PMCSD 238 may be a truly portable application that can be executed remotely by the HCD 202. As would be understood by those skilled in the art, a portable application is generally defined as any computer software program that is able to run independently without the need to install files to the system it is run upon (e.g., the HCD 202). Portable applications can be run on any computer system with which they are compatible but typically require a specific operating system type, such as certain versions of Microsoft® Windows™ or Linux®. Portable software (e.g., the MTM application 248) is typically designed to be able to store its configuration information (e.g., firmware configuration files 254) and data on the storage media (e.g., on the PMCSD 238) containing its program files.

In accordance with another embodiment of the present invention, the MTM application 248 resident on the PMCSD 238 may include a boot component that installs data transfer configuration or support files to the HCD 202 (e.g., temporary and configuration files 220) before the data transfer application is executed by the HCD 202. Unlike a truly portable application, this embodiment of the MTM application 248 can generally be run on most computer systems without requiring specific operating system compatibility. After the MTM application 248 is stopped, any transferred configuration, support files or temporary files (e.g., temporary and configuration files 220) may be removed from the HCD 202 in an optional host clean-up process. This process can allow for the PMCSD 238 to function with many different host device types without burdening a HCD 202 after communications have been halted between the PMCSD 238 and a HCD 202.

Figure 3:
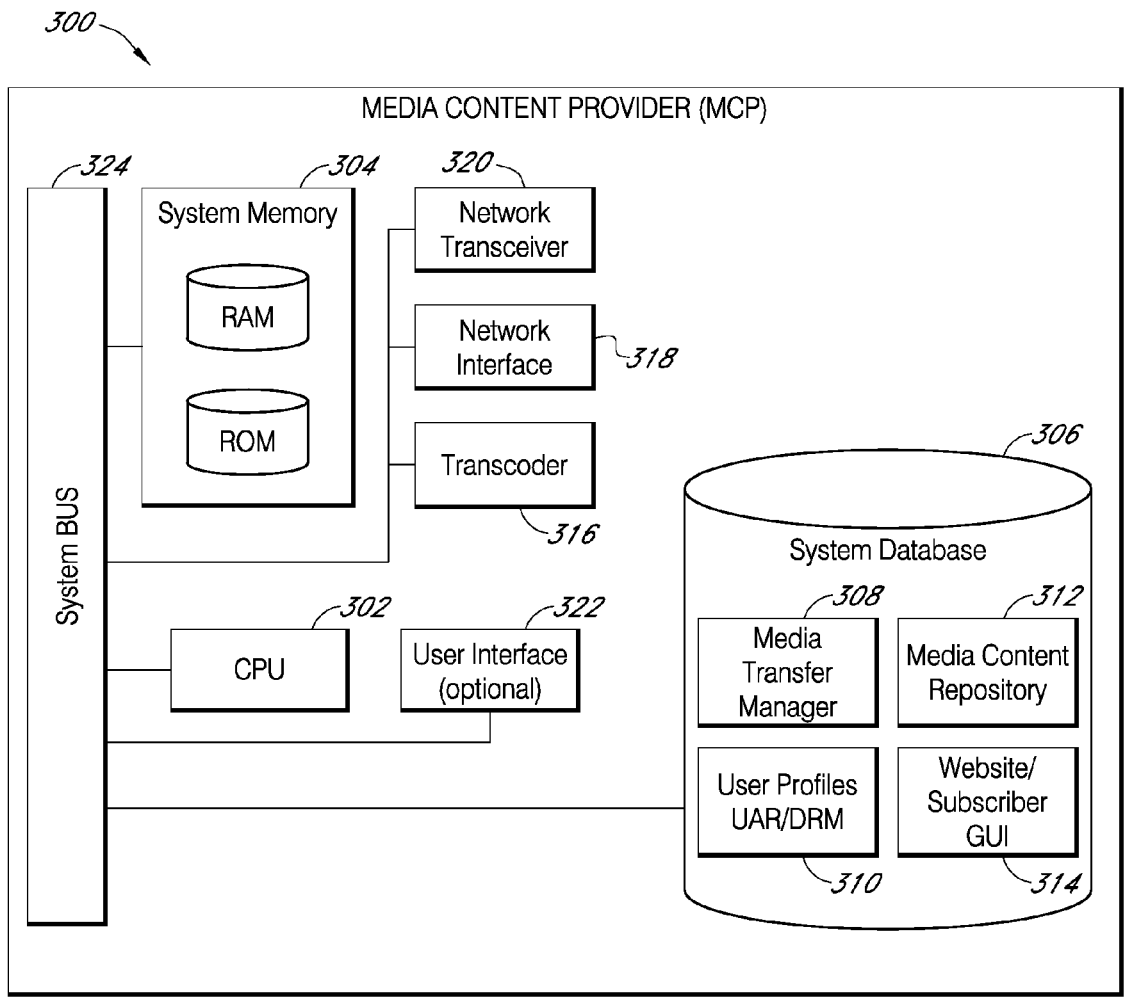
FIG. 3 illustrates a block diagram of a Media Content Provider (MCP) in accordance with an embodiment of the present invention.

FIG. 3 shows a block diagram view of a Media Content Provider (MCP) 300 that may be representative of any of the remote server devices 104*a-c* in FIG. 1. The MCP 300 may include, but is not limited to, one or more processor devices including a central processing unit (CPU) 302. The CPU 302 is generally responsible for executing all computer programs stored on the MCP's 300 volatile (RAM) and nonvolatile (ROM) system memory 304, 306. The MCP 300 may also include, but is not limited to, an optional user interface 306 that allows a user/administrator to interact with the MCP's software and hardware resources; a system database 308 that includes a media content transfer manager application (MC™) 308, a User Profile, User Access Rights (UAR), and Digital Rights Management (DRM) information repository 310, a media content repository 312, as well as a hosted website (See e.g., the MCP website depicted in FIG. 10) including various graphical user interface (GUI) components (e.g., static html and dynamic components, such as java-based applications) that may facilitate a user making media content selections for purchase and download; a transcoder 316 for formatting deliverable media content; a network transceiver 320 and a network interface 318 that allow the MCP 300 to communicate across the LAN and WAN portions of the data communications network 102 of FIG. 1; and a system bus 322 that facilitates data communications amongst all the hardware resources of the MCP 300.

In an embodiment, the MCP's 300 MCTM application 308 may help facilitate delivery of various media content data files (e.g., movies, TV programs, home video, software applications, podcasts, video games, music, e-books, etc.), stored in the MCP's 300 media content repository 312) in response to various media content transfer initiation or re-initiation requests emanating from an execution of the PMCSD's 238 MTM application 248. In various embodiments, an initiation or reinitiation request generated with the PMCSD's 238 MTM application 248 may be automatically delivered to a MCP 300 in response to a PMCSD 238 plug-in or wireless communication initiation event. In other embodiments, an initiation or reinitiation request generated with the PMCSD's 238 MTM application 248 may be sent to a MCP 300 in response to user manually selecting to initiate or re-initiate a data transfer request for one or more media content files. In various embodiments, these media content transfers may relate to media content downloads from a MCP 300 to a HCD/PMCSD 200, or they may relate to media content uploads from a HCD/PMCSD 200 to a MCP 300 (with optional further redistribution to one or more end media playback devices).

In an embodiment, during a digital media content initiation or reinitiation sessions, the communicating MTM 248 and MCTM 308 applications may independently or collectively determine various available network resources (e.g., free bandwidth) between portions of a network linking the media content sending and receiving device(s). In an embodiment, the MCTM application 308 of the MCP 300 communicates with the MTM application 248 of HCD/PMCSD 200 to determine available network resources between the MCP 300 and the HCD/PMCSD 200, in order to schedule a coordinated download session that maximizes available network resources. In another embodiment, the MTM application 248 of HCD/PMCSD 200 communicates with the MCTM application 308 of the MCP 300 to determine available network resources between the HCD/PMCSD 200 and the MCP 300, in order to schedule a coordinated upload session that maximizes available network resources.

Figure 4:
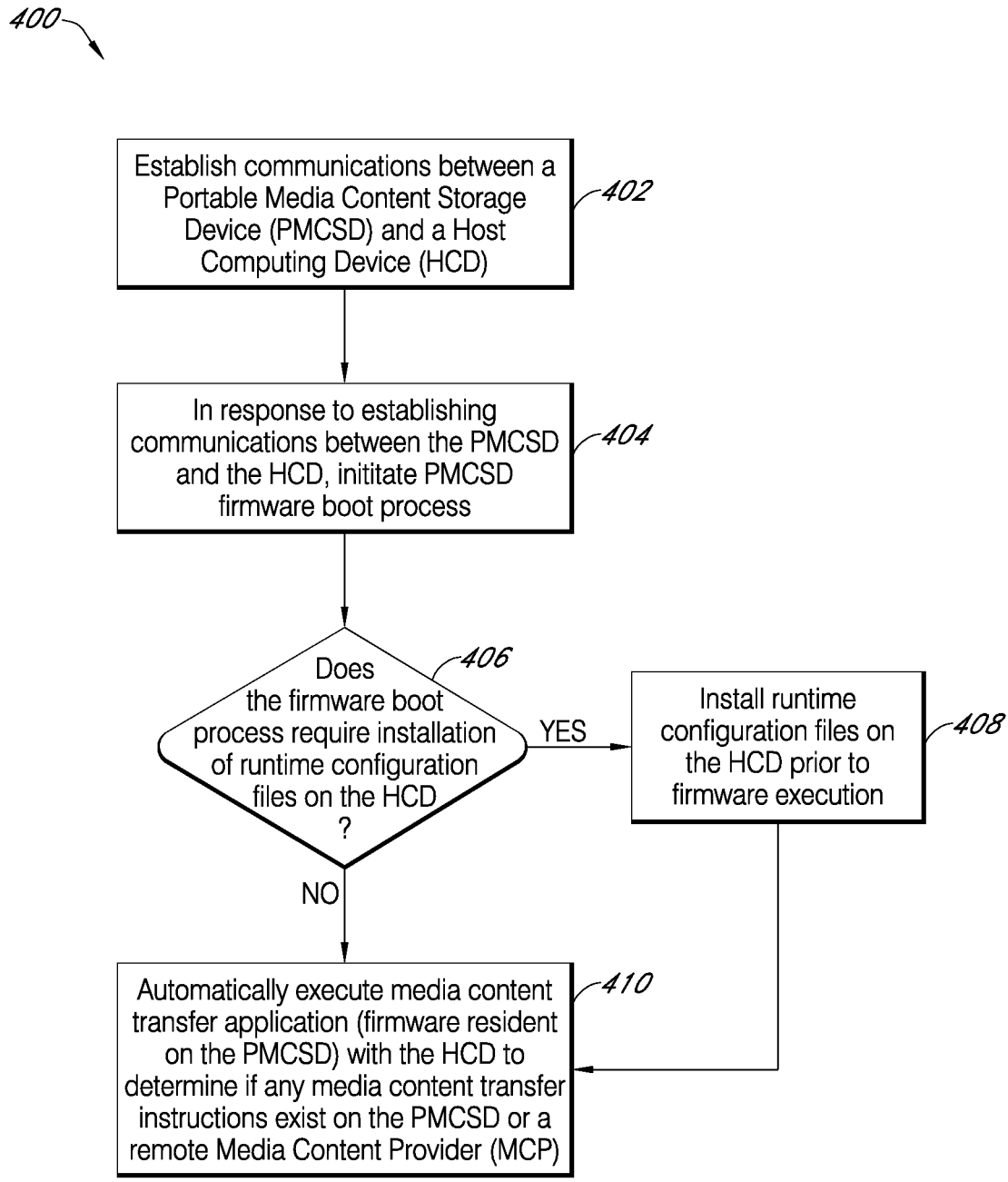
FIG. 4 illustrates a flow diagram depicting a data communications initiation process between a PMCSD and a HCD in accordance with an embodiment of the present invention.

FIG. 4 illustrates a flow diagram 400 depicting a data communications initiation process between a PMCSD 238 and a HCD 202 in accordance with an embodiment of the present invention. It should be understood that this process 400 could be executed using one or more computer executable programs stored on one or more computer-readable media located on any of the LAN connected computing devices (108, 110, 112, 114, 116, 118, 120, 122, 124, 126, or 128) or any of the remote wireless communications devices (130, 132, or 134) of FIG. 1. At block 402, communications between a PMCSD 238 and a HCD 202 are established (e.g., by a plug-in or a data communication initiation event). Next at block 404, a PMCSD 238 firmware boot process (a process that prepares the MTM application 248 to be executed remotely by the HCD 202) may be automatically initiated in response establishing communications between the PMCSD 238 and the HCD 202. Then at decision block 406, it is determined if the firmware boot process requires installation of runtime configuration or support files on the HCD 202 (e.g., whether or not the resident MTM application 248 acts as a truly portable application). If the process does require installation of runtime configuration or support files at block 406, then at block 408, the runtime configuration or support files are installed on the HCD 202 prior to firmware execution. Then the process proceeds from block 408 to block 410. If the process does not require installation of runtime configuration or support files at block 406, then at block 410 a media content transfer application (e.g., MTM application 248) resident on the PMCSD 238 is automatically executed with the HCD 202 to determine if any media content transfer instructions exist on the PMCSD 238 or on a remote MCP 300. In accordance with various embodiments of the present invention, the media content transfer instructions may relate to instructions for new media content transfers and/or instructions for existing, partially completed media content transfers.

Figure 5:
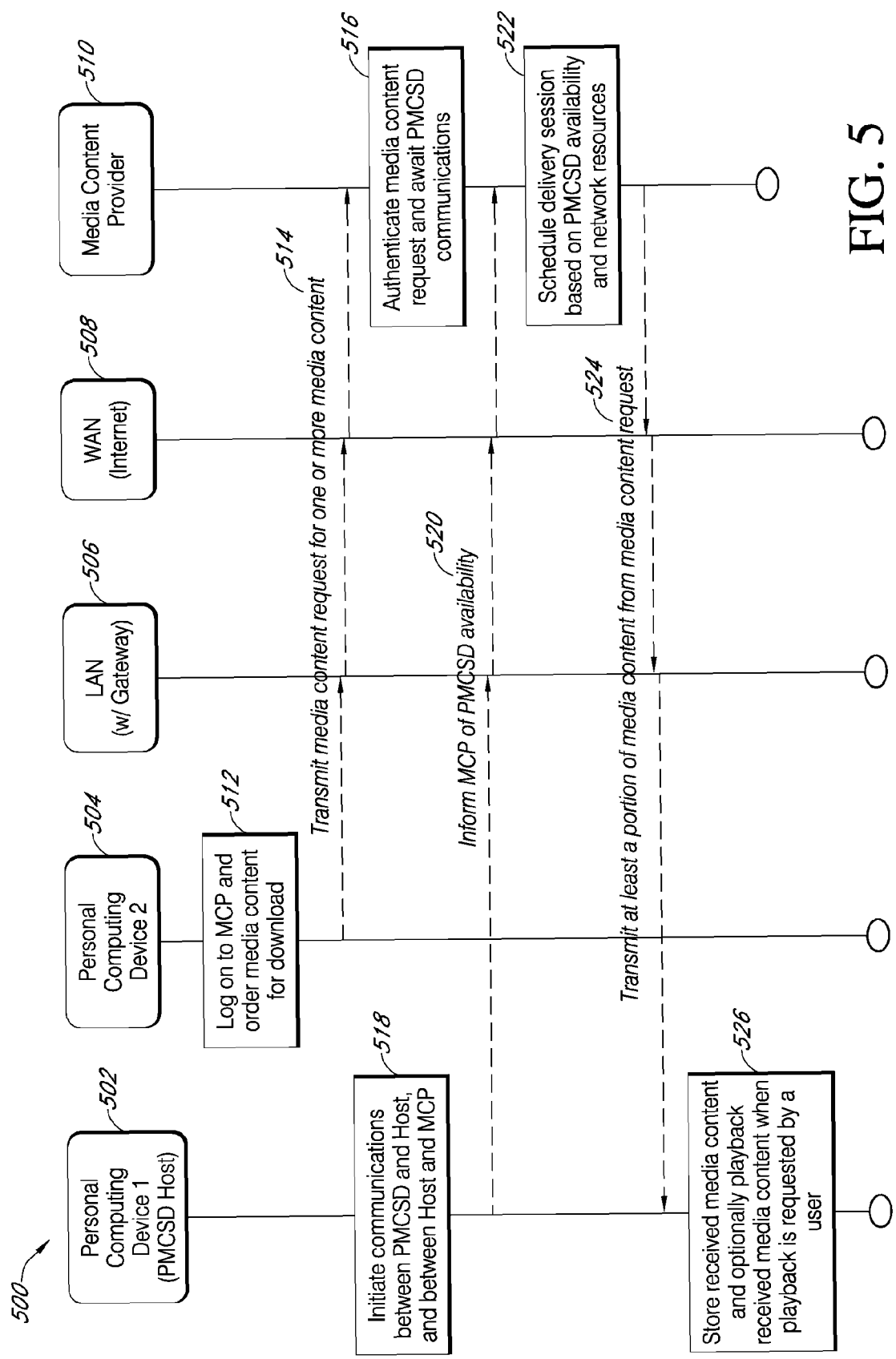
FIG. 5 illustrates a system flow diagram depicting a download request and an associated managed media content transfer process in accordance with an embodiment of the present invention.

FIG. 5 illustrates a system flow diagram 500 depicting a download request and an associated managed media content transfer process in accordance with an embodiment of the present invention. It should be understood that the download process 500 could be executed using one or more computer executable programs stored on one or more computer-readable media located on any of the LAN connected computing devices (108, 110, 112, 114, 116, 118, 120, 122, 124, 126, or 128) or any of the remote wireless communications devices (130, 132, or 134) of FIG. 1. Further, collaborative processes associated with the process 500 could be executed from one or more MCP 300 (e.g., represented by any of the remote server devices 104*a-c*). In an embodiment, the system flow diagram 500 depicts data communications interactions between at least the following devices: a first personal computing devices acting as a host for a PMCSD, PCD1/PMCSD 502 (e.g., PMCSD/HCD 200); a second personal computing device not acting as a host device (PCD 2, e.g., desktop computer 116) 504; a LAN including one or more gateway device 506 (e.g., the LAN portion of data communications network 102, including gateway device 108); a WAN 508, such as the Internet (e.g., the WAN portion of data communications network 102, including one or more remote server devices 104*a-c*); and a MCP having a media content delivery service 510 (e.g., MCP 300).

In accordance with an embodiment of the download process 500, at block 512, a user logs onto a MCP 510 (e.g., any of remote server computers 104*a-c* acting as MCPs) using their PGD2 504 (e.g., a desktop computer 116). This request process optionally includes registered user authentication (e.g., username and password information corresponding to a user account). The user of PCD2 504 then places a download order for digital media content from the MCP 510 using the MCP's website-based interface (See e.g., FIG. 10). This step is represented by the media content request 514 being transmitted from PCD2 504 to the MCP 510, over the LAN 506 and WAN 508 portions of the data communications network 102. Next at block 516, the MCP 510 processes the received media content request and awaits communications from the MTM application 248 of the PMCSD 238. Then at block 518, communications are initiated between the Host PCD and the PMCSD, referred to collectively as the PCD1/PMCSD 502. In accordance with various embodiments of the invention, this communications initiation process could occur in response to a plug-in event or a wireless communications initiation event. Then the PCD1/PMCSD 502 initiates communications between itself and the MCP 510 to inform the MCP 510 of its availability for receiving the requested media content download. This step is represented by the media content availability notification 520 being transmitted from PCD1/PMCSD 502 to the MCP 510, over the LAN 506 and WAN 508 portions of the data communications network 102.

Subsequently, at block 522, the MCP 510 schedules a coordinated media content delivery session based on the received download availability notice and a detected state of available network resources. In accordance with various embodiments of the invention, this delivery may occur all at once in real-time or in segments according to available network bandwidth during different periods of time. In accordance with the scheduled, coordinated media content delivery, at least a portion of media content from the media content request is delivered 524 to the PCD1/PMCSD 502. Then at block 526, the PCD1/PMCSD 502 stores the received media content and optionally plays back the media content (e.g., under either full content media playback or partial content buffering media playback scenarios) when a playback is requested by a user of the PCD1/PMCSD 502 and the PCD1 is a playback device (e.g., a laptop computer 120).

In accordance with various embodiments of the present invention, the PMCSD 238 communications initiation with the HCD 202 may involve automatically detecting an online or active status of HCD 202 connections to a network over which it may communicate with a MCP 300, such as the Internet. In various embodiments of the invention, a HCD 202 may or may not be integrated with playback device functionality (e.g., laptop computer 120 vs. external card-reader/hard-drive device 118). In another embodiment, media content playback can be started on one playback-enabled HCD 202 (e.g., on a wireless handheld gaming unit 122) and resumed on another playback-enabled HCD 202 (e.g., on a cellular phone device 128) by keeping the state of the playback session on the PMCSD 238. It is understood that under some scenarios any of the download and playback processes 500 discussed supra could be happening concurrently for different digital media content. For example, a user may be ordering media content at the same time that previously ordered media content is being delivered to one of their personal computing devices (e.g., any of 110, 112, 114, 116, 118, 120, 122, 124, 126, 128, 130, 132, or 134), at the same time previously delivered media content is being played back on various LAN or WAN connected computing devices (e.g., any of 110, 112, 114, 116, 118, 120, 122, 124, 126, 128, 130, 132, or 134).

Figure 6:
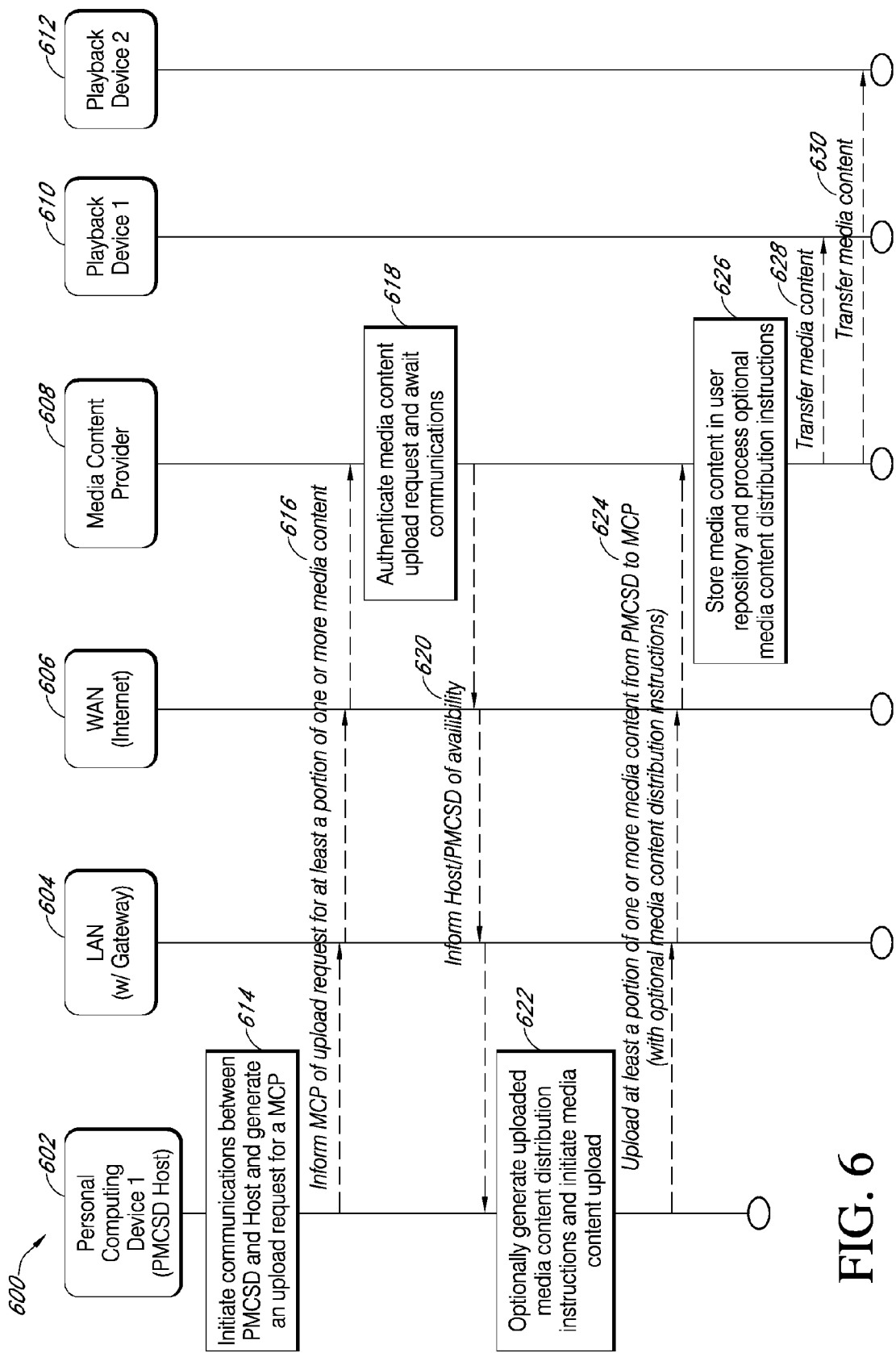
FIG. 6 illustrates a system flow diagram depicting an upload request and an associated media content transfer process with an optional uploaded media content distribution process in accordance with embodiments of the present invention.

FIG. 6 illustrates a system flow diagram 600 depicting an upload request and an associated media content transfer process with an optional uploaded media content distribution process in accordance with embodiments of the present invention. It should be understood that the process 600 could be executed using one or more computer executable programs stored on one or more computer-readable media located on any of the LAN connected computing devices (108, 110, 112, 114, 116, 118, 120, 122, 124, 126, or 128) or any of the remote wireless communications devices (130, 132, or 134) of FIG. 1. Further, collaborative processes associated with the process 600 could be executed from one or more MCP 300 (e.g., represented by any of the remote server devices 104a-c). In an embodiment, the system flow diagram 600 depicts data communications interactions between at least the following devices: a PCD acting as a host for a PMCSD, PCD1/PMCSD 602 (e.g., HCD 202); a LAN 604 including one or more gateway device (e.g., the LAN portion of data communications network 102, including gateway device 108); a WAN 606, such as the Internet (e.g., the WAN portion of data communications network 102, including one or more remote server devices 104a-c); a media content provider (MCP) 608 having media content distribution services (e.g., MCP 300); a first playback device PBD1 610 (e.g., laptop computer 120); and a second playback device PBD2 612 (e.g., PDA device 134).

In accordance with an embodiment of the upload process 600, a user acquires various digital media content with a personal computing device (e.g., with a digital camera 124 or a digital video recorder 126). The acquired digital media content is then stored in a PMCSD 238. Then at block 614, communications between the PMCSD 238 and a HCD 202 are initiated resulting in a logically combined PCD1/PMCSD 602 device. In accordance with various embodiments of the invention, this communications initiation process could occur in response to a plug-in event or a wireless communications initiation event. Next the PCD1/PMCSD 602 generates and transmits an upload request for at least a portion of one or more media content to a MCP 608. This step is represented by the media content upload request 616 (this request optionally includes registered user authentication information) being transmitted from PCD1/PMCSD 602 to the MCP 608, over the LAN 604 and WAN 606 portions of the data communications network 102. Next at block 618, the MCP 608 authenticates/processes the received media content upload request, informs the PCD1/PMCSD 602 of its availability 620, and awaits further communications from the MTM application 248 of the PMCSD 238. Then at block 622, the PCD1/PMCSD 602 optionally generates uploaded media content distribution instructions (e.g., including recipient information 1010 of FIG. 9) for the receiving MCP 608 and then proceeds to upload at least a portion of one or more media content stored on the PMCSD 238 to the MCP 608. This step is represented by the upload media content 624 being transmitted from PCD1/PMCSD 602 to the MCP 608, over the LAN 604 and WAN 606 portions of the data communications network 102. Then at block 626, the MCP 608 stores the received media content in a user repository (e.g., a storage location corresponding to a logged-in, authenticated user) and proceeds to process any media content distribution instructions (e.g., indicating intended distribution to specified recipients 1010 of FIG. 9). Next, the MCP 608 transfers the uploaded media content to intended distribution recipients, PBD1 610 and PBD2 612, in accordance with the received distribution instructions. Generally the redistribution transfers occur over the Internet 606, however for illustrative clarity the transfers are shown in FIG. 6 as being direct transfers from the MCP 608 to the two playback devices, PBD1 610 and PBD2 612.

In accordance with various embodiments of the present invention, the PMCSD 238 communications initiation with the HCD 202 may involve automatically detecting an online or active status of HCD 202 connections to a network over which it may communicate with a MCP 300, such as the Internet. In an embodiment the media content acquiring personal computing device (e.g., a digital camera 124 or a digital video recorder 126) and the HCD 202 could be integrated into the same physical unit. It is understood that under some scenarios any of the upload and distribution processes 600 discussed supra could be happening concurrently for different digital media content. For example, if the media content capturing device (e.g., a digital video recorder 126) is integrated as the HCD 202, a user might be recording content, while previously recorded content is being delivered to a network destination (e.g., MCP 608), while at the same time previously delivered content is being distributed to one or more end users (e.g., PBD1 610, or PBD2 612).

Figure 7A:
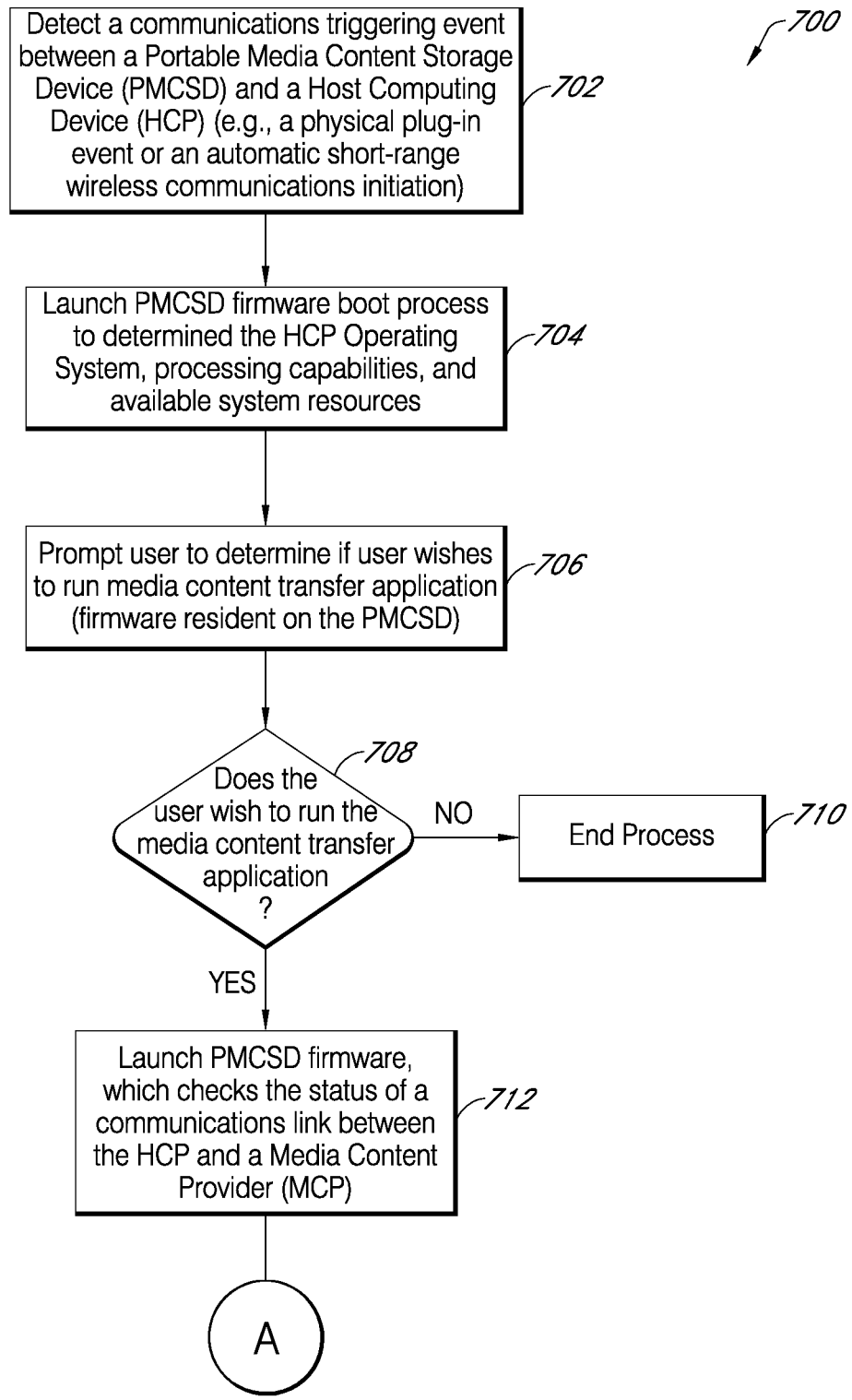
FIGS. 7A-B illustrate flow diagrams depicting a user-interactive media content transfer process initiated by an detected triggering event in accordance with an embodiment of the present invention.
Figure 7B:
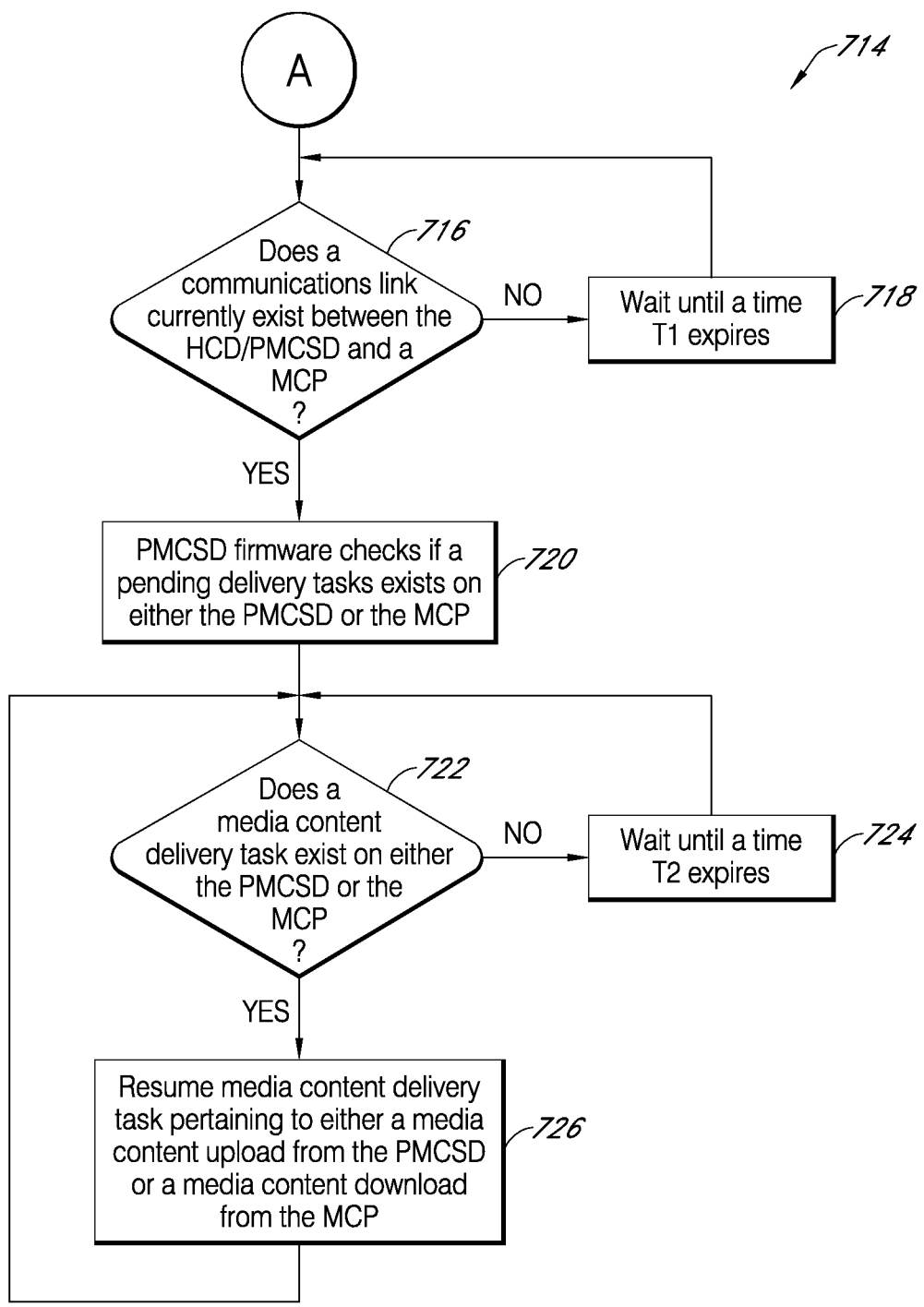

FIGS. 7A-B illustrate system flow diagrams 700, 714, depicting a user-interactive media content transfer process initiated by a detected triggering event in accordance with an embodiment of the present invention. It should be understood that the process 700, 714, could be executed using one or more computer executable programs stored on one or more computer-readable media located on any of the LAN connected computing devices (108, 110, 112, 114, 116, 118, 120, 122, 124, 126, or 128) or any of the remote wireless communications devices (130, 132, or 134) of FIG. 1. Further, collaborative processes associated with the process 700, 714, could be executed from one or more MCP 300 (e.g., represented by any of the remote server devices 104a-c). At block 702, a triggering communications event (e.g., a physical plug-in event or an automatic short-range wireless communications initiation) between a PMCSD 238 and a HCD 202 is detected. Next at block 704, a PMCSD firmware boot process is launched to determine the HCP 202 operating system, processing capabilities, and/or available system resources.

In accordance with an embodiment of the present invention, in response to an initial triggering communications event (e.g., a plug-in or a wireless communications initiation event) between a PMCSD 238 (e.g., integrated PC card 138) and a HCD 202 (e.g., laptop computer 120), the HCD 202 may initiate a resident security application that prevents automatic launching of the PMCSD boot firmware. In an embodiment, these localized security features may facilitate a user manually launching the PMCSD boot firmware after verification that the PMCSD 238 is a "known" or a "safe" device to a particular HCD 202 user or administrator. These host side processes, may occur at or between blocks 702 and 704 of FIG. 7A. It should be understood that any HCD 202 side security features do not affect processes associated with the MTM application 248 for any embodiments of the present invention.

Subsequently, at block 706, a user is prompted to determine if they wish to run a MTM application 248 (also generically referred to herein as PMCSD firmware). Then at decision block 708, it is determined if the user wishes to run the MTM application 248. If the user elects not to run the MTM application 248 at that time, then the process ends at block 710. However, if the user does elect to run the MTM application 248, then at block 712, the launched MTM application proceeds to check the status of a communications link between the HCP 202 and the MCP 300.

At decision block 716, it is determined if a communications link currently exists between the HCD/PMCSD 200 and a MCP 300. If no communications link currently exists between the HCD/PMCSD 200 and the MCP 300, then at block 718 the process waits a predetermined amount of time T1 and then rechecks the status of the communications link between the HCD/PMCSD 200 and the MCP 300 at block 716. However, if a communications link does exist between the HCD/PMCSD 200 and the MCP 300, then the process proceeds to block 720 where the PMCSD firmware (e.g., MTM application 248) checks if a pending delivery task exists on either the PMCSD 238 or the MCP 300. At decision block 722, it is determined if media content delivery task exists on either the PMCSD 238 or the MCP 300. If a media content delivery task does not exist, then at block 724 the process waits a predetermined amount of time T2 and then rechecks the status of pending delivery tasks at block 722. However, if a media content delivery task does exist, then at block 726, a pending media content delivery task pertaining to either a media content upload from the PMCSD 238 or a media content download from the MCP 300 is resumed. After the current delivery task is completed at block 726, the process reverts to decision block 722, where the process checks for other pending media content delivery tasks.

Figure 8:
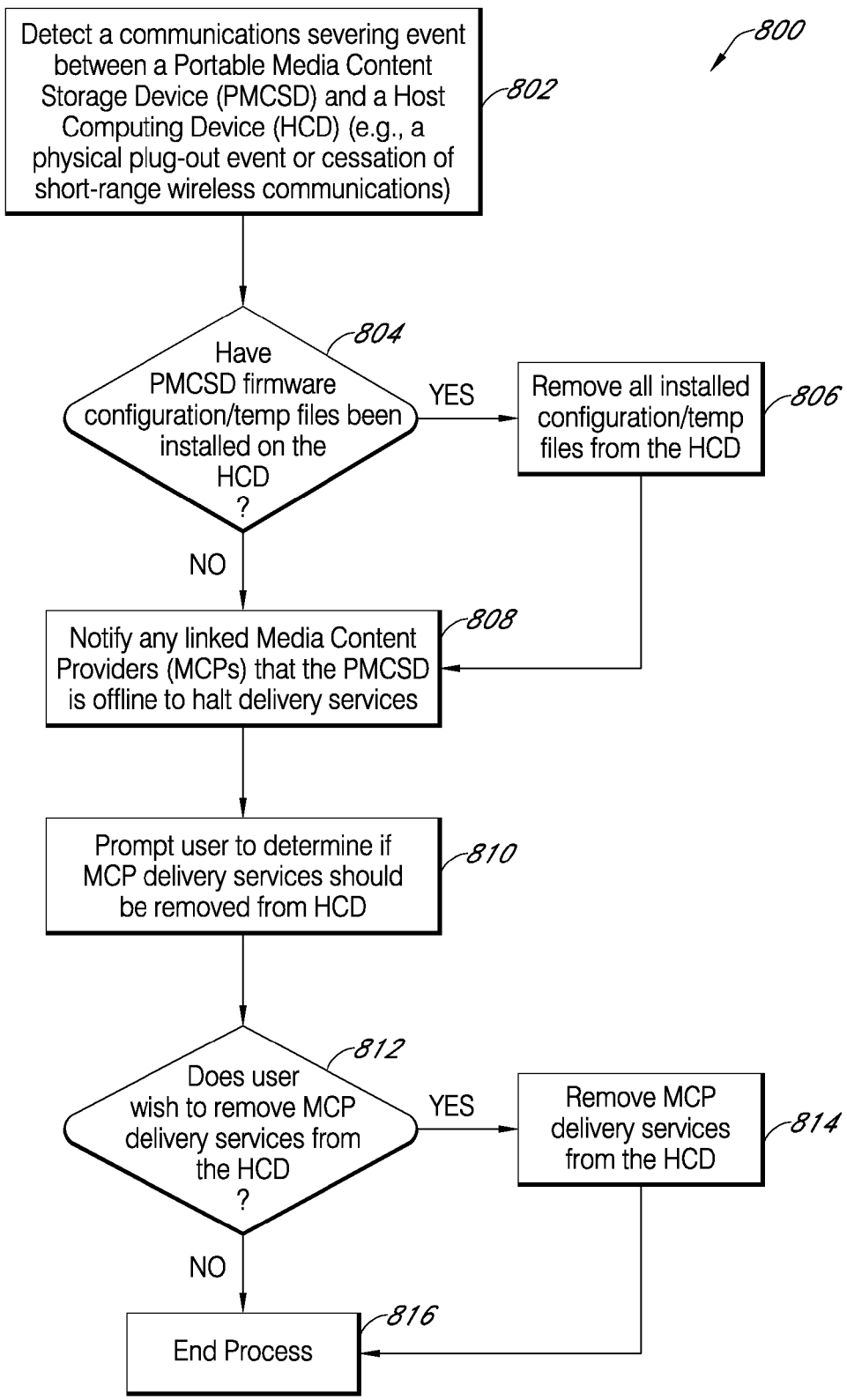
FIG. 8 illustrates a flow diagram depicting a user-interactive communications cessation process and an associated HCD clean-up process initiated by a communications severing event in accordance with embodiments of the present invention.

FIG. 8 illustrates a flow diagram depicting a user-interactive communications cessation process and an associated HCD clean-up process 800 initiated by a communications severing event in accordance with embodiments of the present invention. It should be understood that this process 800 could be executed using one or more computer executable programs stored on one or more computer-readable media located on any of the LAN connected computing devices (108, 110, 112, 114, 116, 118, 120, 122, 124, 126, or 128) or any of the remote wireless communications devices (130, 132, or 134) of FIG. 1. At block 802, a communications severing event (e.g., a physical plug-out event or a cessation of short-range wireless communications event) between a PMCSD 238 and a HCD 202 is detected. Next at decision block 804, it is determined if any firmware configuration, support or temporary files have been installed on the HCD 202. If any firmware configuration, support or temporary files have been installed on the HCD 202 (e.g., during a media content upload or download process), then at block 806 all the HCD 202 installed firmware configuration, support or temporary files are removed from the HCD 202 and the process proceeds to block 808. However if, no firmware configuration, support, or temporary files have been installed on the HCD 202 then the process proceeds to block 808, where all linked MCPs 300 are notified that the PMCSD 238 is offline to halt any active delivery services. Next, at block 810 a user is prompted to determine if existing delivery services should be removed from the HCP 202. At decision block 812, it is determined if a user wishes to remove the MCP 238 delivery services from the HCP 202. If a user wishes to remove delivery services from the HCP 202, then at block 814 delivery services are removed from the HCP 202 and then the process ends to block 816. However, if a user does not wish to remove delivery services from the HCP 202, then the process also ends at block 816.

Figure 9:
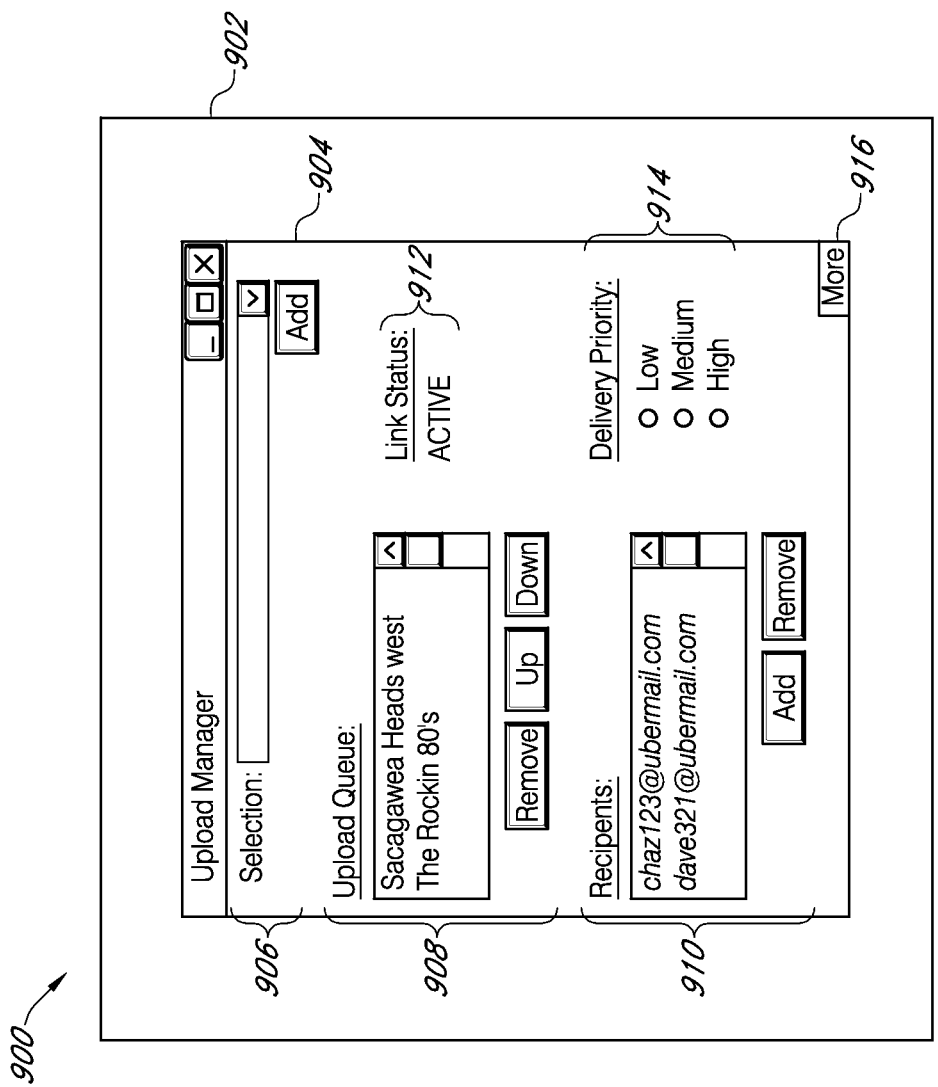
FIG. 9 illustrates an interactive Media Transfer Manger (MTM): Upload Manger application interface displayed on a host computing device in accordance with an embodiment of the present invention.

FIG. 9 illustrates an interactive MTM Upload Manger application display 900 on a host computing device 902 in accordance with an embodiment of the present invention. In an embodiment, the MTM/Upload Manger application display 900 could exist on any of the LAN connected computing devices (112, 114, 116, 120, 122, 124, 126, or 128) as well as any of the remote wireless communications devices (130, 132, or 134) of the networked computing system 100, acting as a HCD 202. In an embodiment, the displayed interactive MTM Upload Manger application interface 904 may include, but is not limited to, the following components: a media content "Selection" component 906 that allows a user of the HCD 902 to select various digital media content files (e.g., digital movies, TV programs, home video, software applications, video games, music, e-books, etc.) on either the PMCSD 238 or the HCD 202 to upload to a MCP 300; an "Upload Queue" component 908 that displays a listing of current media content files awaiting upload; a "Recipients" selection component 910 that allows a user to select one or more recipients to receive various media content uploads (e.g., in an MCP 300 forwarding distribution process); a "Link Status" component 912 that allows a user to see if the HCD 202 that they are using is online (e.g., connected to the Internet); a "Delivery Priority" component 914 that allows a user to select a priority level for one or more media content upload (e.g., an order selection for multiple, concurrent uploads); and a "More" component 916 that allows a user to access various other common data transfer settings known in the art.

Figure 10:
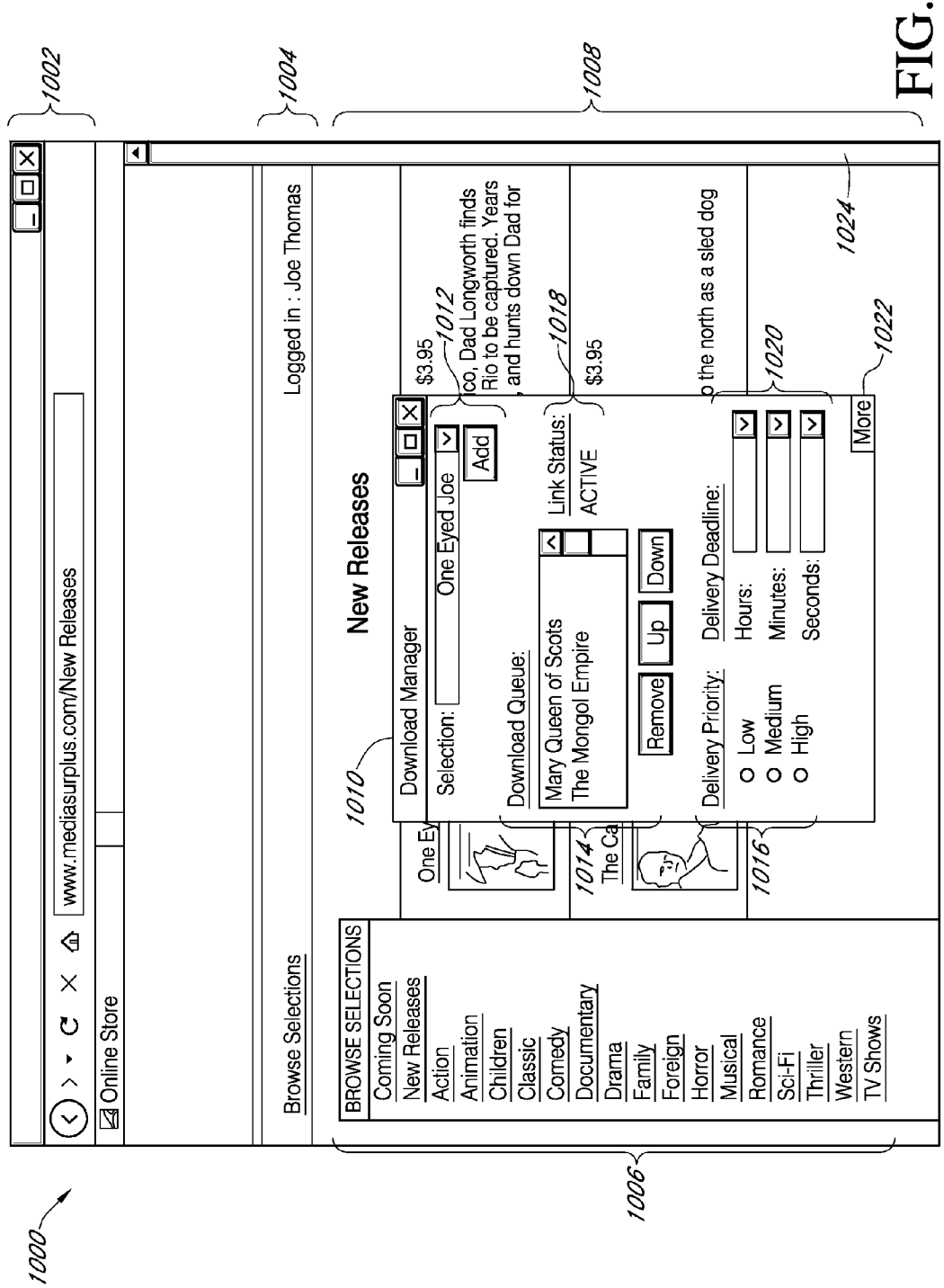
FIG. 10 illustrates an interactive MTM: Download Manger application interface displayed as a browser-based add-on component to a MCP website in accordance with an embodiment of the present invention.

FIG. 10 illustrates an interactive MTM Download Manger application interface 1010 displayed as a browser-based add-on component to a MCP website 1000 in accordance with an embodiment of the present invention. In an embodiment, the MCP website 1000, may include, but is not limited to, a URL address bar 1002 having an HTTP website address (e.g., "www.mediasurplus.com/NewReleases"); a menu header 1004 having a "User Information" section that displays the name of a currently logged in user (e.g., "Joe Thomas"); a "Browse Selections" section 1006 showing a listing of various media content genres (e.g., "Action", "Comedy", "Drama", "Horror", "Sci-Fi", etc.); a media content display section 1008 showing various media content selections from a particular selected media genre (e.g., "New Releases"); a Download Manger application interface 1010 that includes the following components: a media content "Selection" component 1012 that allows a user to select various digital media content files (e.g., digital movies, TV programs, home video, software applications, video games, music, e-books, etc.) at the MCP 300 to download to various user devices (e.g., to any of the LAN or WAN connected computing devices 112, 114, 116, 120, 122, 124, 126, 128, 130, 132, or 134); a "Download Queue" component 1014 that displays a listing of current media content files (e.g., digital movies, TV programs, home video, software applications, video games, music, e-books, etc.) awaiting download (e.g., the movies "Mary Queen of Scots" and "The Mongol Empire"); a "Delivery Priority" component 1014 that allows a user to select a priority level for a media content download (e.g., an order selection for multiple, concurrent uploads); a "Link Status" component 1018 that allows a user to see if an HCD 202 they wish to download to is online (e.g., connected to the MCP 300 over the Internet); a "Delivery Deadline component" 1020 allowing a user to select a maximum duration over which a media content download should take place; and a "More" component 1022 that allows a user to access various other common data transfer settings known in the art. In an embodiment, the MCP website 1000, may also include one or more scroll bars 1024 that facilitate viewing additional portions of the MCP website 1000.

In accordance with an embodiment, the following scenario would be facilitated by the present invention. A user may wish to receive digital media content (e.g., digital movies, TV programs, home video, software applications, video games, music, e-books, etc.) whenever the user has access to HCDs 202 that are connected to a communications network. The user may have in his possession a small flash-based memory PMCSD 238 (e.g., a SD card 140*a-e*, USB drive 142*a-b*, or compact flash drive 136*a-d*) for this purpose. Whenever the user plugs the PMCSD 238 into an online HCD 202 (e.g., any of computing devices 110, 112, 114, 116, 118, 120, 122, 124, 126, 128, 130, 132, or 134) the PMCSD's firmware (e.g., MTM application 248) may be activated to begin or resume downloading digital media content that the user has ordered, subscribed to, or content proactively pushed by content owners or service providers (e.g., by a MCP 300). Further, whenever the PMCSD 238 is removed from the HCD 202, the software processes left on the host may be removed which has the benefit of assuring that residual software cannot cause or be implicated in software issues on the HCD 202 which may be a shared device used by other users.

Once the media content is delivered to the PMCSD 238, the PMCSD can be inserted into a wide variety of HCDs 202 (e.g., any of computing devices 110, 112, 114, 116, 118, 120, 122, 124, 126, 128, 130, 132, or 134) for playback or transfer of delivered media content. In an embodiment, for content having use restrictions, the delivered content may be optionally cryptographically bound to the PMCSD 238, such that the PMCSD may be protected against misuse of the policies set by a media content or service provider 300 (e.g. by well known methods of securing data in flash memory).

Then the user may elect to take the PMCSD 238 with stored media content on a business trip. While on an airplane, the user can insert the PMCSD 238 into his laptop computer 120 to be able to access any previously downloaded, or otherwise acquired, digital media content (e.g., digital movies, TV programs, home video, software applications, video games, music, e-books, etc.). In an embodiment, the user may have viewed half of a movie stored on the PMCSD 238 on his laptop computer 120 while on his business trip. Then the user returns home and inserts the PMCSD 238 into his large format flat panel television 112 or attached set-top box player 114 to finish the movie starting in where he left off viewing on the laptop computer 120. In this way, a video bookmark data for the user is maintained within the PMCSD 238, so that a user can always resume watching or listening to a media content where he or she left off. In an embodiment, if multiple users playback the same media content then each users viewing information (e.g., video bookmark information) for the same media content can be independently tracked.

Then, before the playback is completed on the large format flat panel television 112 or attached set-top box player 114, the user removes the PMCSD 238 from his HCD 202 and then reinserts the PMCSD 238 into his laptop computer 120 at work the next day to finish watching the same media content. Because the laptop computer 120 has a wireless network connection, the PMCSD 238 can continue to receive new media content online while the user finishes watching the rest of a previously delivered media content.

In accordance with another embodiment, the following scenario would be also be facilitated by the present invention. A user on vacation records a large quantity of video using their digital video camera 126. The user stores the video media content onto a connected PMCSD 238 (e.g., a SD card 140*a-e*, USB drive 142*a-b*, or compact flash drive 136*a-d*). Whenever the user removes the PMCSD 238 from the camera and inserts it into an online HCD 202 (e.g., any of computing devices 110, 112, 114, 116, 118, 120, 122, 124, 126, 128, 130, 132, or 134) the PMCSD's 238 firmware (e.g., the MTM application 248) is activated to begin or resume uploading the video media content to a MCP 300 and/or to other networked end playback devices (e.g., any of computing devices 110, 112, 114, 116, 118, 120, 122, 124, 126, 128, 130, 132, or 134). In an embodiment, whenever the PMCSD 238 is removed from the HCD 202, software processes left on the HCD 202 may be automatically removed, which allows the user to freely use his PMCSD 238 on a variety of HCD 202 types without burdening any particular host device.

Then, on his way back from a vacation the user takes the PMCSD 238 with vacation videos stored thereon and plugs the PMCSD 238 into his 3G-enabled cellular phone 130. In an embodiment, whenever the cellular phone 130 is connected to a cellular, Wi-Max™, or Wi-Fi™ enabled network the phone uploads the video media content on the PMCSD 238 to a MCP 300, so that by the time the user returns home, the video media content has already been forwarded (by the MCP 300) to the user's intended destinations.

In an embodiment the PMCSD 238 combines portable local storage with imbedded software/firmware to facilitate the autonomous delivery of media content to or from the PMCSD 238. The PMCSD 238 may work in conjunction with a HCD 202 that can supply some or all of the capabilities needed by the PMCSD 238 to perform its intended functions. In accordance with various embodiments, the HCD 202 may include, but is not limited to, the following: electrical power for the PMCSD 238, electrical/mechanical interface suitable for PMCSD 238, detection software/firmware for sensing PMCSD 238 communication initiation events, automatically executing scripts to launch and interact with PMCSD 238 software/firmware programs, processor(s) to execute the PMCSD 238 software/firmware instructions, memory to load PMCSD 238 software/firmware for execution by the host processor, playback software/firmware for retrieving and playing back content stored on the PMCSD 238, video conversion hardware, firmware and interfaces for the formatting of digital media into formats suitable for attached or networked display units (e.g. HDMI, S-video, component video, etc.), network interfaces to sense, establish and maintain connectivity to local, access, or wide-area networks (e.g. Ethernet, Wi-Fi™, 3G, Wi-Max™, etc.), and wireless link quality monitoring software/firmware and the ability to report metrics to PMCSD 238 software/firmware programs.

In an embodiment, the PMCSD 238 is implemented on a flash memory card of standard format (e.g., a SD card 140*a-e*, USB drive 142*a-b*, or compact flash drive 136*a-d*) and contains the media transfer software/firmware and secure local storage for media and associated metadata (e.g. DRM keys), while relying on the HCD 202 for all other functions. In contrast, in accordance with another embodiment, the PMCSD 238 could be completely independent and perform all necessary functions in a physically contained unit not requiring a separate HCD 202 to function at all. In an embodiment, the content transfer is envisioned to involve large data files relative to the capacity of the networks carrying the traffic, the PMCSD 238 software/firmware for delivering content to/from the PMCSD 238 should be capable of detecting and using surplus network bandwidth, and capable of gracefully handling intermittent connectivity intervals between source (e.g., PMCSD 238) and destination endpoints (e.g., MCP 300). A preferred way to handle these scenarios would be to utilize systems and methods associated with the segmented data delivery processes disclosed in commonly owned U.S. Pat. No. 7,500,010, titled "Adaptive File Delivery System and Method", by Harrang et al., issued Mar. 3, 2009, incorporated herein by reference.

In accordance with various embodiments of the present invention, the PMCSD 238 may include some or all of the hardware or software functionality of the HCD 202. For example, media player software may be included on the PMCSD 238 along with the other firmware (e.g., MTM application 248). Another example could be the PMCSD 238 combined with a wireless modem such as a 3G USB transceiver having flash memory.

It should be understood from that the PMCSD 238 contains all the necessary software needed to facilitate delivery of content to or from the PMCSD 238 (or recording/playback of content) when inserted into an appropriate HCD 202.

In accordance with an embodiment of the present invention, whenever the PMCSD 238 is plugged-in to a HCD 202 the PMCSD 238 launches a process on the HCD 202, mounting the PMCSD 238 as a mass-storage device and auto-launching PMCSD 238 software boot routines run by the HCD 202 processor to detect the type of host processor and operating system (OS), along with available HCD 202 resources. In some embodiments, this can cause the HCD 202 OS to first prompt the user whether the MLC boot routines should be executed. Assuming the user agrees, the process continues. Next the boot process prompts the user if they wish to launch the PMCSD 238 MTM application 248 delivery service. If the user does not wish to use the MTM application 248 delivery service the boot process quits.

If the user elects to continue MTM application 248 delivery service uses the HCD 202 resources to check the link status. If the HCD MTM application 248 delivery service 202 is offline the boot process waits and retries after a T1 timer wait interval. When the MTM application 248 delivery service detects that the HCD 202 is online (e.g., network attached MCPs 300 are reachable) it then checks the saved job status to see if it is currently working on a delivery job. Alternatively, if there are no current jobs the delivery service polls the MCP 300 for any new pending jobs. If there are no orders the delivery service waits for a T2 timer interval before again resuming checking the status of the HCD 202 connection.

If a current media content order exists, the delivery may be started or resumed. The media content is delivered to/from the PMCSD 238 storage and the status of the delivery job is periodically updated so that it may be resumed if interrupted prior to completion. When the order is complete the process resumes checking the status of the HCD 202 connection.

In accordance with an embodiment of the invention, the event sequence that takes place when the PMCSD 238 is removed from the HCD 202 that supports the card interface begins when the previously loaded boot routines detect that the PMCSD 238 has been removed from the HCD 202. When PMCSD 238 removal is detected, the boot process runs a de-install routine that cleans up any temporary files left in HCD 202 memory. If the device is online, the delivery service routine is signaled that the client status is offline so delivery halts. The boot process halts the delivery service. Next, the user is prompted to choose whether the services should be removed from HCD 202 memory. If the user elects to keep the services resident the startup boot process will be accelerated the next time the PMCSD 238 is plugged into the HCD 202 Otherwise, the services are deleted from host process and the boot process removes itself from HCD memory.

The advantage of cleaning up HCD 202 memory in this fashion is to remove all services, temporary files, and images that the PMCSD 238 places in HCD 202 memory during normal operation. The PMCSD 238 can therefore be used on multiple HCDs 202 without leaving behind software images from its operation.

As discussed herein, an adaptive file delivery system and method transmits a data file, such as an audio-video file, over a network or collection of networks in segments wherein each segment is transmitted during a different time period. Each time period has a transmission portion to transmit its associated file segment and a wait portion in which no further interaction with the network occurs regarding the transmitted segment. In some implementations, the duration of the transmission portion of each time period is sufficient to reach a steady-state throughput condition, which allows the traffic load status of the network or networks to be determined from rate measurements of file segment transmissions. The duration of the wait portion of each time period is at least long enough to provide an effective rate of file segment transmission that accommodates network traffic load variations while causing the entire file to be delivered in a predetermined delivery deadline.

In general, networks having large user populations experience regular peak congestion periods with somewhat daily, weekly, and yearly periodicity. Designing networks to weather these peak periods is the domain of traffic engineering. Network designers must focus on peak congestion in order to build out the network resources to handle the load adequately during these exceptional periods of operation. Unfortunately, this necessarily means there are large gaps in time when the networks are underutilized.

Furthermore, with data applications, there is a tradeoff between how much available bandwidth is required between source and destination, and how long it takes to deliver the information. For many applications there is the expectation of real-time or near-real-time latency between the request and delivery of the information. For instance, when a personal computer (PC) user enters a web address, there is the expectation that the page will be retrieved in a few seconds or less. Similarly, for a large email transfer, once the request is made, the network is expected to complete the operation at the peak rate the network is able to deliver. However, for non-real-time applications where the delivery deadline is hours or days away, the data transfer rate can be drastically reduced.

The adaptive file delivery system and method provides selective scheduling of the delivery of massive files, such as large format high resolution audio-video and other media files, during periods of minimum network activity. By extending delivery times, efficient transport of large amounts of information can be accomplished with little or no impact on the existing networks connecting the sender and receiver. The adaptive file delivery system supports massive file transfer while smoothing network peaks created when large number of users are actively online at once. The adaptive file delivery system and method can also be scalable depending upon delivery requirements.

The adaptive file delivery system contributes in reducing network impacts of transferring massive files, in responding quickly to congestion caused by other network traffic, in adjusting transfer rates to maintain delivery deadlines, and in scaling to large numbers of receiving systems and sending systems without impacting worst-case network model scenarios.

Figure 11:
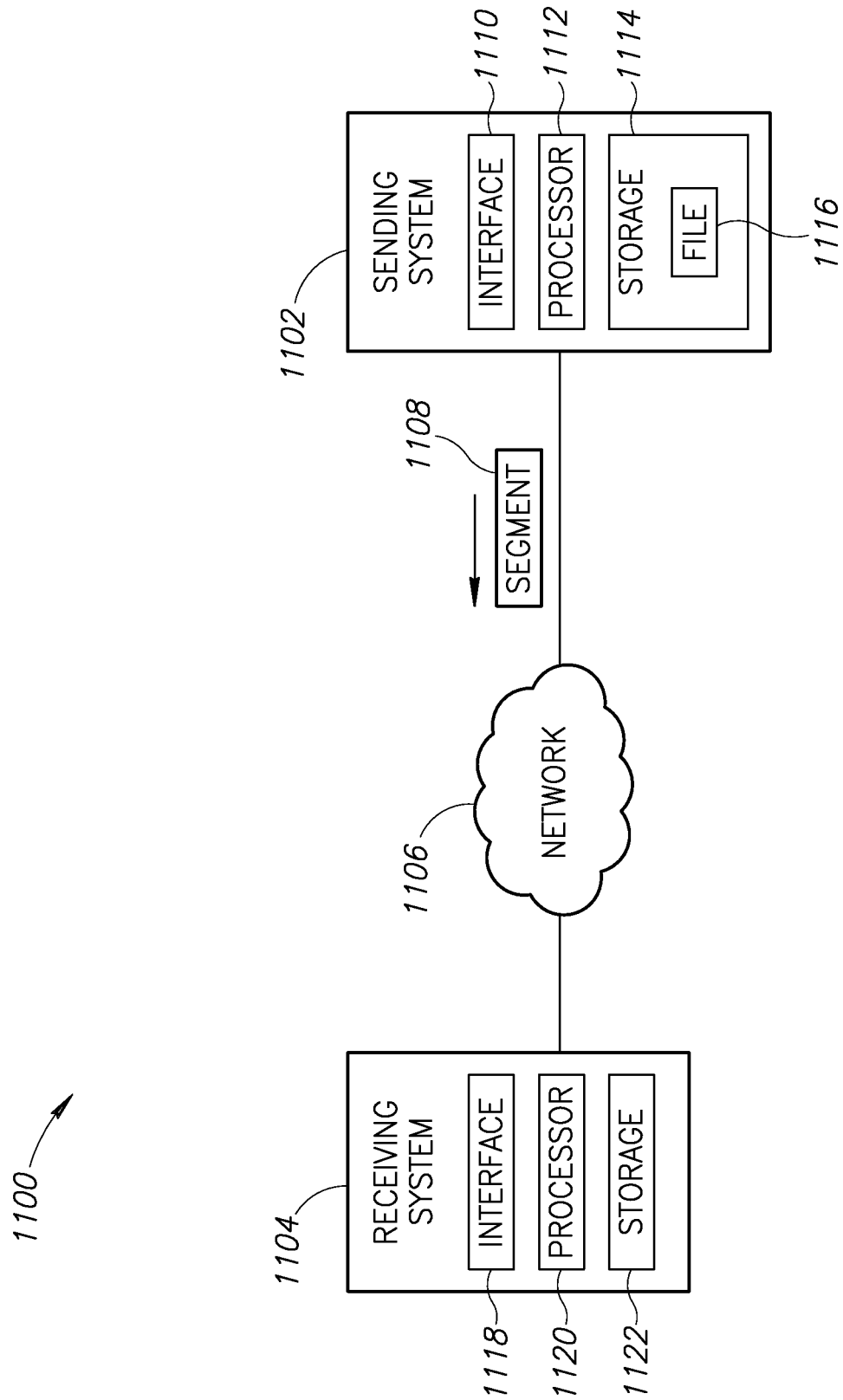
FIG. 11 is a schematic generally representing an exemplary implementation of an adaptive file delivery system.

An adaptive file delivery system 1100 is shown in FIG. 11 to include a sending system 1102 and a receiving system 1104 both communicatively linked to a network 1106. The sending system 1102 could be comprised of a computer system or a plurality of collocated or distributed computer systems such as a servers, databases, storage units, routers, switches, firewalls, or other such devices, connected via fiber, wireline, wireless means to the network 1106. The receiving system 1104 could be collocated with a DVR, PC, network storage unit, client work station, television set top box, modem, gateway, or other such devices such as a personal data assistant (PDA), portable audio-video player, cellular communication device such as a cell phone or in a dedicated hardware unit. The receiving system 1104 could be connected via fiber, wireline, wireless means to the network 1106. The network 1106 could include one or more network components from the Internet or other networks, such as WANs, including but not limited to wired (DSL, cable, powerline), fiber, wireless, satellite, and cellular type networks. The network 1106 could include other such network components such as but not limited to modems, routers, bridges, gateways, network interfaces, cabled transmissions, wireless transmissions, local area networks (LANs), access networks, provider networks, and peer-to-peer arrangements. The sending system 1102 is shown in FIG. 11 as sending a file segment 1108 over the network 1106 to the receiving system 1104. The sending system 1102 includes an interface 1110 to access the network 1106, a processor 1112, and storage 1114 containing a file 1116 to be transmitted over the network to the receiving system 1104 and containing one or more modules with instruction to implement adaptive file delivery methods. The receiving system 1104 includes an interface 1118 to access the network 1106, a processor 1120, and storage 1122 to store copies of portions of the file 1116 received from the sending system 1102 and to store one or more modules to implement instructions regarding adaptive file delivery methods. It is understood that the receiving system 1104 could be located at an end user's location or be located at some intermediary network location e.g. to serve as a caching mode for distributing content geographically closer to a plurality of end users.

The file segment 1108 is a copy of a portion of the file 1116. The sending system 1102 sends a copy of the file 1116 to the receiving system 1104 by breaking up the file copy into a plurality of segments such as including the segment 1108 shown in FIG. 11. The plurality of segments is sent over the network 1106 one at a time until the receiving system 1104 has received an entire copy of the file 1116. Each segment is sent at a different one of a plurality of time periods.

The time periods each have a transmission portion in which one of the file segments is transmitted and a wait portion in which none of the file segments are transmitted. The wait portions can effectively space out the transmission portions so that the file segments are transmitted over a period of time that is significantly larger than if the segments were transmitted as a continuous stream of segments. The transmission portions of the time periods are spaced out to significantly lessen detrimental impact upon traffic load of the network 1106 involved with transmission of massive files. Based upon approaches further described below, larger sized file segments and/or a larger number of the file segments are transmitted when traffic load on the network 1106 is relatively light than when traffic load on the network is relatively heavy. By at least partially utilizing periods of light network traffic, massive files can be transmitted with reduced detrimental impact upon traffic load of the network 1106.

In some implementations, a user of the receiving system 1104 uses a graphical user interface to request of the sending system 1102 a file with an associated delivery deadline and priority among a plurality of similar file requests for separate content files. Through the request, the sending system 1102 and receiving system 1104 are informed that the receiving system has authorization to receive the requested file and are informed of the transfer configuration details. An overview of some of the events occurring with adaptive file delivery are included in the following, not necessarily in the following order: (1) the receiving system 1104 requests a file, (2) the sending system 1102 locates and obtains authorization for delivery of the requested file and in some implementations obtains a digital rights management (DRM) license, (3) the adaptive file delivery module or modules of the sending system obtains transfer details such as delivery deadline, client profile including client LAN idle-schedule, provider network 1106 idle-schedule, file size, and so forth, (4) the adaptive file delivery module or modules of the receiving system obtains transfer details such as identity of the sending system, file size, and so forth, (5) sending system calculates the minimum transfer rate needed to meet the requested delivery deadline and the maximum rate allowable for transfer of segments of the file. Some implementations are based on standard client/server TCP/IP or UDP/IP interactions between the sending system 1102 as server and the receiving system 1104 as client.

Figure 12:
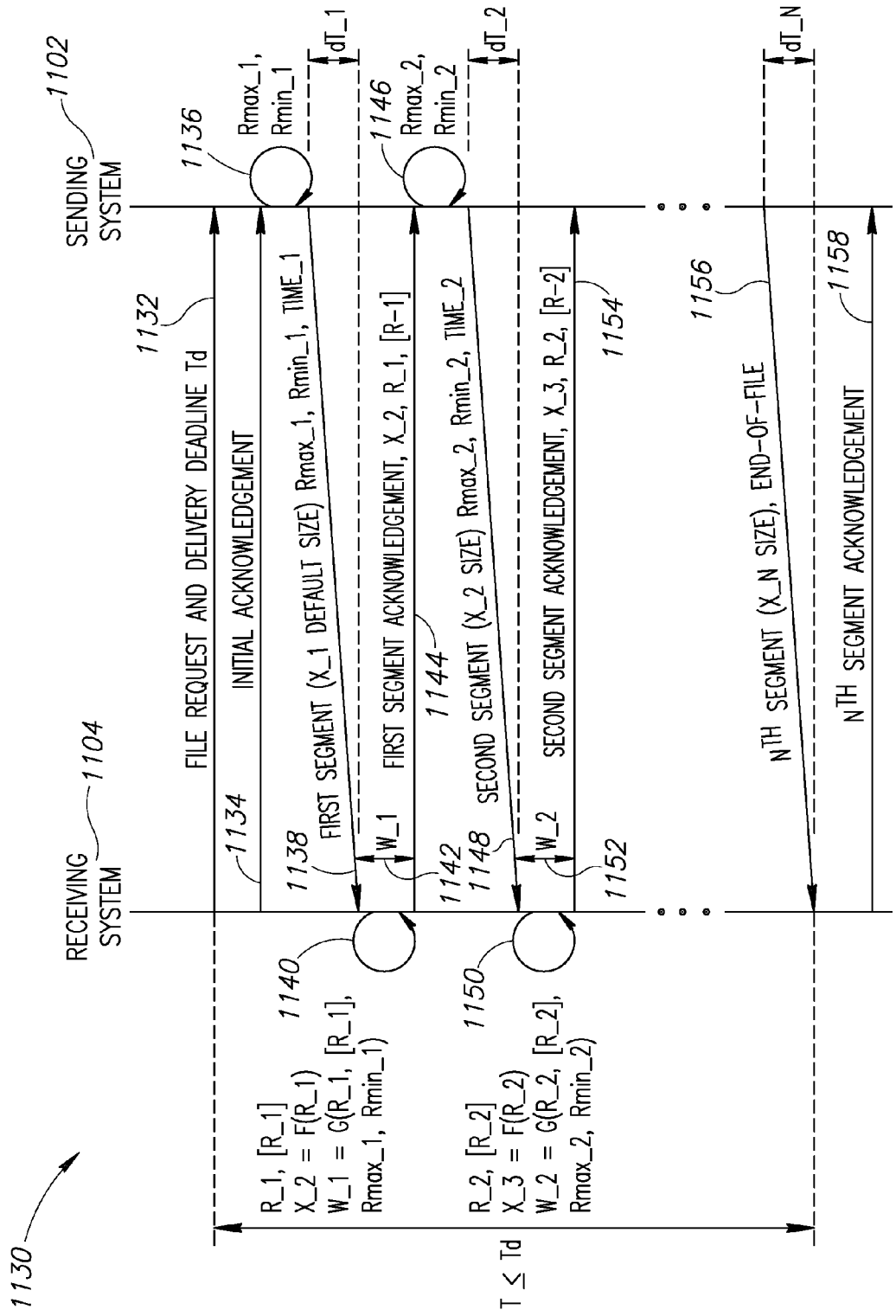
FIG. 12 is an interaction diagram depicting an exemplary implementation of methods used by the adaptive file delivery system of FIG. 11.

An exemplary adaptive file delivery method 1130 is shown in FIG. 12 to include the receiving system 1104 sending a file request and a delivery deadline, Td, to the sending system 1102 (step 1132). Although passage of time as depicted in FIG. 12 follows a downward vertical direction, the passage of time is not shown to scale in FIG. 12. Generally, only the time periods, W_j, associated with the wait portions of the transmission periods, and the time periods associated with the time periods, dT_j, associated with the segment transmission portions of the transmission periods require relatively significant amounts of time to pass. Although it may appear on FIG. 12 that other activities depicted take a relatively significant amount of time, as well, these other activities in general take relatively insignificant amounts of time and are allotted additional space along the vertical axis of FIG. 12 only for convenience in displaying the activities due to the limitations of the form of depiction rather than an intent to display these other activities as taking relatively significant periods of time.

The delivery deadline, Td, is generally a time by when a user of the receiving system 1104 would desire the receiving system to have received all segments of the file 1116. In some implementations, the delivery deadline, Td, may be calculated by the system 1100 to be of a certain duration (e.g., a plurality of hours or days from a time the file is first requested or begun to be transmitted or from another time) and as a consequence, may effectively reduce the overall transfer rate of the file to a level even below an overall rated or experienced minimum capacity of the network 1106, such as even below a capacity of the network experienced during certain congested periods or experienced during other periods of network activity. The receiving system 1104 then sends to the sending system 1102 an initial acknowledgment, which serves as a request for the first file segment to be sent by the sending system (step 1134). Upon receiving the initial acknowledgment from the receiving system 1104, the sending system 1102 determines a first maximum segment transmission rate limit, Rmax_1, and a first minimum segment transmission rate limit, Rmin_1 (step 1136).

In general, the minimum segment transmission rate limit, Rmin, is determined by the sending system 1102 based upon two factors. The first factor is file size, Xrem, of that remaining portion of the file 1116 that has yet to be sent by the sending system 1102 to the receiving system 1104. The second factor is the amount of remaining time available to transmit file segments from the sending system 1102 to the receiving system 1104 between the present time of the determination, Tnow, and the time of the delivery deadline, Td. The amount of remaining time available may be reduced by predetermined amounts of time, Tunavail, known when adaptive file delivery cannot occur above a configurable lower transfer rate threshold (that could be zero or higher) for the particular file transmission due to unavailability of the network 1106 and/or the sending system 1102 and/or the receiving system 1102 for segment transmission.

These unavailable time periods, Tunaval, may be typically busy periods for the network 1106 and/or the sending system 1102. The unavailable time periods, Tunaval, can be pre-configured into the profiles of the sending system 1102 and/or the receiving system 1104. Alternatively, the unavailable time periods, Tunaval, can be determined by the sending system 1102 and/or the receiving system 1104 by examining historical data of previous transmissions including adaptive file delivery transmissions. For instance, historical data regarding the actual segment transmission rates, R_j, for one or more of the jth segment transmissions of an adaptive file delivery could be examined to determine busy times for the sending system 1102, and/or the receiving system 1104, and/or the network 1106.

For example, a user of the receiving system 1104 may want to block adaptive file delivery for a particular time period during each weekday from 9:00 a.m. to 11:00 a.m. if the user's requirements for tasks for the receiving system other than adaptive file delivery necessitates maximum performance from a portion of the network 1106 local to the receiving system during those times. For the blocked period, the user of the receiving system 1104 could configure the profile of the receiving system to indicate whether a transfer was permitted to proceed during this blocked period at some minimal background rate, such as a rate below Rmin_j. Alternatively, the user may configure the profile of the receiving system 1104 to not receive any adaptive file delivery during this blocked period. If a user of the receiving system 1104 does not specify a time period when the user does not want the receiving system to receive file segments, then the receiving system can learn these block out periods by monitoring use of the receiving system and one or more portions of the network 1106 local to the receiving system for such things as busy periods, variation in segment transmission rates, etc. Similarly, an access network provider might want to block adaptive file delivery for particular busy hour periods during each day if the providers network was otherwise busy or near capacity with unrelated traffic. The provider might also want to limit the plurality of adaptive file delivery jobs across their network to an aggregate minimal background rate.

A prudent measure would insure that the sending system 1102 would conservatively determine the value for each minimum transfer rate, Rmin_j, to be larger than may be necessary to meet the requested delivery deadline, Td, if actual practice fortunately has more favorable conditions than may be conservatively anticipated. It is understood by this conservative approach that calculations of Rmin_j typically presuppose a "just in time" completion of adaptive file delivery based on the remaining file size and any anticipated idle periods.

Since the network 1106 may have a surplus capacity not factored into the conservative Rmin_j determinations, the adaptive file delivery may proceed faster than an estimate based upon segment transmissions performed exclusively at an average rate of all the Rmin_j involved in the adaptive file delivery. Consequently, a number of actual transfers of various massive files may finish early. Using a conservative approach of estimating Rmin_j provides a buffer of time against unanticipated network congestion and maintains the expectation of completing the adaptive file delivery by the requested delivery deadline, Td. If, due to unexpected congestion, a transfer falls behind its minimum rate schedule, the adaptive file delivery methods automatically compensates by gradually raising the minimum transfer rate, Rmin_j, after each successive jth segment transmission as the delivery deadline approaches. This gradual raising of successive minimum transfer rates, Rmin_j, is a graceful way of adjusting priorities to favor late jobs over on-time or ahead-of-schedule jobs. Rmin_j is evaluated by the sending system 1102, or in alternative implementations by the receiving system 1104, each time a file segment is sent from sending system to the receiving system.

An exemplary equation for determination of Rmin for the jth transmission is as follows:

$$Rmin\_j = Xrem\_j / (Td - Tnow\_j - Tunaval\_j). \quad (1)$$

In some implementations, the sending system 1102 can send updates to an estimated delivery time, which may be the same as, sooner than, or later than the requested delivery deadline, Td, depending whether any delaying events occur on the network 1106. A practical result of keeping the receiving system 1104 updated as to an estimated delivery time would be to reduce the number of inquiries by a user of the receiving system regarding this estimated delivery time.

In general, the maximum segment transmission rate limit, Rmax, is greater than the minimum segment transmission rate limit, Rmin, by an amount depending on one or more of a number of possible factors including any additional surplus transmission capacity of the sending system 1102 that has not been allocated to another transmission task. Other possible factors that could be used to influence Rmax include the maximum permitted transfer rate to a user determined by their service agreement with their network provider, the actual measured rate of last segment or averaged rate of the last N segments, pre-configured access network provider profiles, etc. Thus, the maximum segment transmission rate limit, Rmax, is determined by the sending system 1102 based upon three factors.

The first factor is the minimum segment transmission rate limit, Rmin, already determined. The second factor is the maximum transmission rate capacity, Rcap, of the sending system 1102. Maximum transmission capacity of the sending system 1102 is affected by such things as transmission bandwidth capacity of the interface 1110 of the sending system.

The third factor takes into consideration not only the present task for the sending system 1102 to transmit the file 1116 to the receiving system 1104, but also takes into consideration any other active jobs for other file transmission tasks undertaken by the sending system to transmit at least a portion of another file to the receiving system 1104 or any other receiving systems during the time span in which the file 1116 is to be sent. The number of these other tasks can be expressed as "Q−1" so that the number Q includes all active transmission jobs including the file 1116 transmission task.

One approach assumes that any surplus transmission capacity of the sending system 1102 would be allocated equally among the Q transmission tasks. By this approach, transmission surplus allocated to the file 1116 transmission task would be the difference between Rcap/Q and the average of the minimum segment transmission rate limits of the Q transmission tasks, <Rmin>. The average <Rmin> can be expressed as Sum(Rmin)/Q where Sum(Rmin) represents the sum of all the various minimum segment transmission rate limits for the Q transmission tasks.

An exemplary equation for determination of maximum segment transmission rate limit, Rmax, for the jth segment transmission of file 1116 transmission task is as follows:

$$Rmax\_j = Rmin\_j + Rcap/Q\_j - Sum(Rmin)\_j/Q\_j.$$

It is understood that Rmax_j as calculated in Equation 2 would be limited to values equal to or exceeding Rmin_j.

Equation 2 is an example of a policy that the sending system 1102 might enforce but other policy decisions could equally be employed to calculate Rmax. For instance, an alternative approach would not equally share surplus bandwidth but would rather give priority to selected transmission jobs. For instance, in order to give surplus transmission capacity temporarily to particular jobs, the sending system 1102 could use congestion measurements to reduce Rmax for jobs that were unable to take advantage of the maximum allocated rate.

In addition to Equation 2, it is further understood that Rmax_j could be subject to a number of additional constraints intended to further react to congestion sensed in the network 1106. An additional exemplary Equation (2a) for determination of the maximum segment transfer rate limit, Rmax, for jth segment of file 1116 transfer task is as follows:

$$Rmax\_j = H(R\_(j-1)) * Rmax\_j \qquad (2a)$$

where Rmax_j on the right side of Equation 2a is as calculated in Equation 2 above and where R_(j−1) is the actual measured rate of the previously sent segment or zero if it is the first segment. For example $$H(R\_(j-1)) = (R\_(j-1)/Rpeak)^{**}n, n=2,3 \qquad (2b)$$

where Rpeak is the maximum allowed throughout to a given receiving system 1104, e.g. enforced by the receiving system's network 1106. Other functional dependencies on the measured rate R as in equation 2b and other congestion sensing metrics are possible including configured time-of-day profiles from operators of the network 1106, feedback of congestion sensing agents in the network 1106, and so on.

After determining the first maximum segment transmission rate limit, Rmax_1, and the first minimum segment transmission rate limit, Rmin_1 in step 1136, the sending system 1102 transmits a first transmission (step 1138) including a first segment of the file 1116, values for Rmax_1 and Rmin_1 and a time stamp indicating the time that the first transmission was sent from the sending system. The first transmission is the transmission portion of a first time period, which also includes a wait portion as discussed further below.

The file size of the first segment, X_1, is a predetermined default value. In general, a file segment is made up of a number of smaller file sub-segment portions. In some implementations, a file to be transmitted to the receiving system 1102 from the sending system 1102, is stored in storage 1114 of the sending system formatted into segments of sequentially numbered sub-segment portions of fixed size. Although in these implementations the size of the sub-segment portions do not change, individual segments made up of sub-segment portions can have different sizes by containing different number of sub-segment portions. The sub-segment portions can be sized to be the smallest portion of a file that can be sent by a network having a predetermined transmission capacity typically having a smallest practical value.

Upon receipt of the first transmission from the sending system 1102, the receiving system 1104 performs a number of determinations (step 1140) regarding (1) the actual transmission rate, R_1, of the first transmission, (2) the effective transmission rate [R_1] of the first transmission, and (3) the time duration, W_1, of the first wait portion of the total time period associated with the first transmission.

In determining the actual transmission rate of the first transmission, the receiving system 1104 determines the time difference, dT_1, between completion time of the first transmission as measured by the receiving system and start time of the first transmission as indicated by the time stamp found in the first transmission received by the receiving system. This time difference, dT_1, is used by the receiving system 1104 as the transmission time for the first transmission.

The receiving system 1104 either measures or reads from data included with the first transmission the segment size, X_1, of the first segment sent in the first transmission. The receiving system 1104 is then able to calculate an actual transmission rate, R_1, of the first transmission by the following general equation for the jth transmission:

$$R\_j = X\_j/dT\_j.$$

The receiving system 1104 then determines an effective transmission rate, [R_1], of the first transmission to accommodate present conditions regarding the sending system 1102 and the network 1106 known to the sending system. In general, the effective transmission is the file size of a segment divided by the total duration of the time period associated with the segment. This time period as discussed above includes a segment transmission portion and a wait portion. If the wait portion had a duration of zero, then the effective transmission rate would be equal to the actual transmission rate, which, if it exceeded Rmax, would most likely cause detrimental network impact for transmission of massive files or multicast transmission of significantly sized files. By selecting an effective transmission rate that is significantly smaller than the actual transmission rate and consistent with Rmax, the sending system 1104 can lessen or virtually eliminate detrimental impact to the network 1106 of transmission of massive files or multicast transmission of significantly sized files.

In some implementations, the network 1106 could be made up of portions such as including the Internet, a regional network, and a local network serving the receiving system 1104. Given the determined value of the actual transmission rate, R_1, of the first transmission and possibly given status input from other devices such as network probes or status information of the sending system 1102 contained in the first transmission, the receiving system 1104 selects an effective transmission rate, [R_1], for the first transmission that is appropriate to whatever status information is known to the receiving system.

By using the determined actual transmission rate, R_1, of the first transmission and possible other input, the receiving system 1104 is able to react to congestion between the sending system 1102 and the receiving system wherever the congestion may be located. For instance, if a portion of the network 1106 local to the receiving system 1104 is busy with unrelated traffic or has status unknown to the receiving system, the receiving system can select an effective transmission rate, [R_1] for the first transmission equal to the first minimum segment transmission rate limit, Rmin_1. Selection of the first minimum segment transmission rate limit will cause the least amount of impact upon the network 1106 while still meeting the delivery deadline, Td.

On the other hand, if the network 1106 is known by the receiving system 1104 to be practically idle, the receiving system can select an effective transmission rate, [R_1], for the first transmission equal to the first maximum segment transmission rate limit, Rmax_1, which would still not detrimentally impact the network given that little if any other network traffic is present. Typically, network conditions and those of the sending system 1102 may be in an intermediate condition so that if this condition is known to the receiving system 1104, the receiving system would select an effective transmission rate, [R_1], for the first transmission between the first minimum segment transmission rate limit, Rmin_1, and the first maximum segment transmission rate limit, Rmax_1.

The receiving system 1104 can also halt an adaptive file delivery altogether or proceed at an effective transmission rate, [R_j] for the jth transmission at a rate even below the value of minimum segment transmission rate, Rmin_j, for the jth transmission to accommodate other adaptive file deliveries or other activities on the network 1106 and/or on the sending system 1102 and/or the receiving system 1104. For example, in some versions the receiving system could be notified by software congestion sensing agents attached to a local area network shared by the receiving system, that the local area network was becoming congested with unrelated network traffic, whereupon the receiving system could halt or reduce the effective transmission rate of the adaptive file delivery. In cases where the receiving system 1104 has adjusted the effective transmission rate, [R_j] for the jth transmission below the minimum segment transmission rate, Rmin_j, for the jth transmission, the sending system 1102 recalculates an incrementally larger minimum segment transmission rate, Rmin_j+1 for the j+1th segment transmission based on the remaining file size and delivery deadline. Consequently, pacing of the segment transmissions tends to accommodate unexpected network congestion or interruptions in transmission. In other implementations, selection of the effective transmission rate for the jth transmission, [R_j] can be required to always stay between the minimum segment transmission rate limit and the maximum segment transmission rate limit for the particular transmission involved.

The receiving system 1104 paces transmissions of the segments by selection of the effective transmission rates to transfer a copy of the file 1116 from the sending system 1102 at an adaptive rate to accommodate changing conditions with the sending system 1102 and/or the receiving system 1104 and/or the network 1106. By using the value for the actual transmission rate, R_1, of the first transmission and possible other input, the receiving system 1104 is able to make an intelligent choice for the effective transmission rate. Through these adaptive file transfer methods, the segment transmissions are used as an actual sounding system for the end-to-end downlink connection capacity from the sending system 1102 to the receiving system 1104. The adaptive file delivery system 1100 can then react to congestion between the sending system 1102 and the receiving system 1104 regardless of location of the congestion.

Based upon a selection by the receiving system 1104 for the effective transmission rate, [R_1], for the first transmission, the time duration, W_1, of the first wait portion of the total time period associated with the first transmission can be derived by the following general equation for the jth transmission:

$$W\_j = X\_j/[R\_j] - X\_j/R\_j.$$

As part of step 1140, the receiving system 1104 also calculates the size of the next segment to be sent by the sending system 1102, namely, the second segment having a second segment size, X_2. To do so, the receiving system 1104 uses a predetermined general value, Tss for the amount of time required for the network 1106 to reach a steady-state condition in transmitting a segment. For instance, in a TCP environment, Tss could be equal to approximately 5 seconds. The actual transmission rate, R_1, for the first transmission is multiplied by Tss to get X_2 by the following general equation:

$$X\_j+1 = R\_j * Tss.$$

It is also illustrated that variability in the actual transmission rates from one file sequent transfer to the next might cause undesirable oscillation in the calculation of X_(j−1). One practical method for avoiding this is to use a sliding window average of the last N samples of the actual transfer rate R.

After waiting (step 1142) the time duration, W_1, of the first wait portion of the total time period associated with the first transmission, the receiving system 1104 transmits (step 1144) a first segment acknowledgment including the second segment size, X_2, to the sending system 1102.

The sending system 1102 then determines (step 1146) a second minimum segment transmission rate limit, Rmin_2, using equation (1) and a second maximum segment transmission rate limit, Rmax_2 using equation (2). The sending system 1102 transmits a second segment of the file 1116 having the second segment size, X_2 in a second transmission (step 1148). The sending system 1102 also transmits values for Rmax_2 and Rmin_2 and transmits a timestamp indicating the time that the second transmission was sent from the sending system 1102.

Upon receiving the second segment, the receiving system 1104 calculates (step 1150) the time required for the second segment transmission, dT_2, and using the value for the second segment size, X_2, determines the actual transmission rate, R_2, of the second segment from equation (3). Also in step 1150 the receiving system 1104 selects an effective transmission rate for the second segment [R_2] based upon known network traffic conditions as discussed above and then determines a second wait portion, W_2, for the total time period associated with the second transmission according to equation (4). The receiving system 1104 then determines a third segment size, X_3, according to equation (5).

After waiting (step 1152) the second wait portion, W_2, of the total time period associated with the second transmission, the receiving system 1104 sends a second segment acknowledgment (step 1154) including the value for the third segment size, X_3.

Subsequently, the sending system 1102 sends remaining segments of the file 1116 to the receiving system 1104 according to the procedure discussed above until the final nth segment of the file 1116 is sent in an nth segment transmission (step 1156) to the receiving system optionally including an end of file indication.

The adaptive file delivery proceeds in this fashion, paced by the receiving system 1104, until the adaptive file delivery is complete. In the unfortunate event that the adaptive file delivery stalls or is disrupted by a network outage, the receiving system 1104 retains the state of the transfer in the storage 1122, such as non-volatile memory, for resuming the adaptive file delivery at the point of interruption to minimize or prevent wasted bandwidth. The receiving system 1104 detects a stalled session, for example, by maintaining a count-down timer, such as found in a module stored in the storage 1122 and implemented by the processor 1120.

The count-down timer can start when the receiving system 1104 makes the initial request to the sending system 1102. The sending system 1102 can then repeat for requests up to a given number of repetitions for adaptive file delivery each time the count-down timer expires after being reset. At each reset of the count-down timer the count-down time until expiration can be increased by a large factor, such as by an exponential factor, so that additional requests by the receiving system 1104 can be spaced out accordingly. At the end of the final request by the receiving system 1104 for adaptive file delivery, the receiving system can then declare the particular adaptive file delivery session to be stalled and can then attempt to connect to a second one of the sending systems 1102, if available, for continuation of the adaptive file delivery. If the receiving system 1104 fails to make contact with a second one of the sending systems 1102, the receiving system can continue to make periodic attempts to contact one of a number of the sending systems listed as available until the delivery deadline, Td, has passed, after which the particular adaptive file delivery job is terminated by the receiving system and any portions of the file 1116 that are stored in the receiving system are erased and an error is logged for notification to the receiving system user(s).

Since the nth segment is the final segment of the file 1116, in some implementations, the receiving system 1104 does not perform determinations regarding an actual nth segment transmission rate, $R\_n$, an effective nth segment transmission rate, $[R\_n]$, etc. but rather sends an nth segment acknowledgment (step 1158) to the sending system 1102 without executing a wait portion, $W\_n$, for the nth transmission.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A networked computing system for automatically initiating and controlling distribution of various media content, the networked computing system comprising:
    a media content provider (MCP);
    at least one host device;
    a portable media content storage device (PMCSD); and
    a data communications network facilitating data communications amongst all computing devices within the networked computing system, wherein in response to data communications being initiated between the PMCSD and a host device, a data transfer application resident on the PMCSD is automatically executed to determine if any media content transfer instructions exist on the PMCSD or the MCP, and when the executed data transfer application determines that there is at least one media content transfer instruction on the PMCSD or the MCP, the at least one media content transfer instruction is processed by the host device, such that at least a portion of at least one media content, made up of a plurality of file segments, is automatically transferred from a sender one of the PMCSD and the MCP to a different receiver one of the PMCSD and the MCP without user intervention using surplus network bandwidth by:
    transferring the plurality of file segments from the sender to the receiver, wherein each of the plurality of file segments is transferred as a series of sub-segments via the data communications network using a transport layer communication protocol;
    determining, by the receiver, an actual transfer rate at which a selected one of the plurality of file segments was sent from the sender to the receiver, wherein the transfer of the selected file segment spans a sufficient amount of time to permit a network transfer rate from the sender to the receiver to reach a steady-state; and
    determining, by the receiver, a wait period based in part on the actual transfer rate determined for the selected file segment transmission and based in part on network congestion measurements,
    wherein transferring the plurality of file segments comprises transferring file segments by a plurality of transmissions spaced out in time with the determined wait period occurring after the transmission of each of the plurality of file segments to thereby avoid congestion in the data communications network.

2. The networked computing system of claim 1, wherein the data transfer application resident on the PMCSD is a portable application that is executed by the host device without needing to install any data transfer application configuration or support files to the host device.

3. The networked computing system of claim 1, wherein the data transfer application resident on the PMCSD includes a boot component that installs temporary data transfer files to the host device before the data transfer application is executed by the host device, and when the data transfer application execution is stopped, the temporary data transfer files are removed from the host device.

4. The networked computing system of claim 1, further comprising:
    at least one end receiving device, wherein the sender is the PMCSD and the receiver is the MCP,
    the portion of the at least one media content transferred by the sender to the receiver is a transferred media content, and
    the MCP selectively distributes a portion of the transferred media content to the at least one end receiving device.

5. The networked computing system of claim 1, wherein the sender is the MCP and the receiver is the PMCSD.

6. A non-transitory computer-readable medium encoded with a set of computer-executable instructions for initiating and controlling distribution of various media content, which when executed, perform a following method comprising:
    initiating data communications between a portable media content storage device (PMCSD) and a host device;
    automatically executing a data transfer application resident on the PMCSD in response to the initiated data communications;
    determining with the data transfer application if any media content transfer instructions exist on the PMCSD or on a media content provider (MCP); and
    when the executed data transfer application determines that there is at least one media content transfer instruction on the PMCSD or the MCP, automatically processing the at least one media content transfer instruction, such that at least a portion of at least one media content, made up of a plurality of file segments, is automatically transferred from a sender one of the PMCSD and the MCP to a different receiver one of the PMCSD and the MCP without user intervention using surplus network bandwidth by:
    transferring the plurality of file segments from the sender to the receiver, wherein each of the plurality of file segments is transferred as a series of sub-segments via a data communications network using a transport layer communication protocol;

determining, by the receiver, an actual transfer rate at which a selected one of the plurality of file segments was sent from the sender to the receiver, wherein the transfer of the selected file segment spans a sufficient amount of time to permit a network transfer rate from the sender to the receiver to reach a steady-state; and determining, by the receiver, a wait period based in part on the actual transfer rate determined for the selected file segment transmission and based in part on network congestion measurements, wherein transferring the plurality of file segments comprises transferring file segments by a plurality of transmissions spaced out in time with the determined wait period occurring after the transmission of each of the plurality of file segments to thereby avoid congestion in the data communications network.

7. The non-transitory computer-readable medium of claim 6, wherein the data transfer application resident on the PMCSD is a portable application that is executed by the host device without needing to install any data transfer application configuration or support files to the host device.

8. The non-transitory computer-readable medium of claim 6, wherein the data transfer application resident on the PMCSD includes a boot component that installs temporary data transfer files to the host device before the data transfer application is executed by the host device, and when the host device.

9. The non-transitory computer-readable medium of claim 6, wherein the sender is the PMCSD and the receiver is the MCP,
the portion of the at least one media content transferred by the sender to the receiver is a transferred media content, and
the MCP selectively distributes a portion of the transferred media content to at least one end receiving device connected to the data communications network.

10. The non-transitory computer-readable medium of claim 6, wherein the sender is the MCP and the receiver is the PMCSD.

11. A computer-executable method for initiating and controlling distribution of various media content, the method comprising:
initiating data communications between a portable media content storage device (PMCSD) and a host device;
automatically executing a data transfer application resident on the PMCSD in response to the initiated data communications;
determining with the data transfer application if any media content transfer instructions exist on the PMCSD or on a media content provider (MCP), one of the PMCSD and the MCP being a sending system, another of the PMCSD and the MCP being a receiving system; and
when the executed data transfer application determines that there is at least one media content transfer instruction on the PMCSD or the MCP, processing the at least one media content transfer instruction, such that at least a portion of at least one media content, made up of a plurality of file segments, is automatically transferred from the sending system to the receiving system without user intervention using surplus network bandwidth by:
determining a maximum transfer rate for transferring a selected file segment of the plurality of file segments based in part on a maximum transfer capacity of a data communications network and congestion measurements for the data communications network;
transferring the selected file segment from the sending system to the receiving system, wherein each of the plurality of file segments is transferred as a series of sub-segments via a data communications network using a transport layer communication protocol;

determining, by the receiving system, an actual transfer rate at which the selected file segment was sent from the sending system to the receiving system based in part on size of the selected file segment and an elapsed time between when the selected file segment was sent from the sending system and when the selected file segment was received at the receiving system, wherein the transfer of the selected file segment spans a sufficient amount of time to permit a network transfer rate from the sending system to the receiving system to reach a steady-state;

determining, by the receiving system, a wait period to avoid congestion based in part on the maximum transfer rate, the actual transfer rate, and network congestion of the data communications network;

after receiving the selected file segment at the receiving system, waiting the wait period before sending an acknowledgement message from the receiving system to the sending system, the acknowledgement message acknowledging receipt of the selected file segment by the receiving system; and sending the acknowledgement message from the receiving system to the sending system.

12. The computer-executable method of claim 11, wherein the data transfer application resident on the PMCSD is a portable application that is executed by the host device without needing to install any data transfer application configuration or support files to the host device.

13. The computer-executable method of claim 11, wherein the data transfer application resident on the PMCSD includes a boot component that installs temporary data transfer files to the host device before the data transfer application is executed by the host device, and when the data transfer application execution is stopped, the temporary data transfer files are removed from the host device.

14. The computer-executable method of claim 11, wherein the PMCSD is the sending system and the MCP is the receiving system,
the portion of the at least one media content transferred by the sending system to the receiving system is a transferred media content, and
the MCP selectively distributes a portion of the transferred media content to at least one end receiving device connected to the data communications network.

15. The computer-executable method of claim 11, wherein the MCP is the sending system and the PMCSD is the receiving system.

16. A portable media content storage device (PMCSD), comprising:
at least one processor;
at least one memory comprising a resident data transfer application; and
a data communications interface facilitating communications between the PMCSD and an external computing device, wherein in response to data communications being initiated between the PMCSD and the external computing device, the resident data transfer application is automatically executed to determine if any media content transfer instructions exist that designate a portion of PMCSD memory as a destination location for at least a portion of media content in queue for transfer, and when the executed resident data transfer application determines that the PMCSD is a destination for a portion of media content in queue for transfer, the PMCSD communicates with a media content source using a data communications network between the external computing device and the media content source to schedule an automatic media content delivery of at least a portion of the media content, made up of a plurality of file segments, in queue for transfer to the PMCSD without user intervention, the automatic media content delivery comprising:

determining a maximum transfer rate for transferring a selected file segment of the plurality of file segments based in part on a maximum transfer capacity of the data communications network and congestion measurements for the data communications network;

transferring the selected file segment of the media content from the media content source to the PMCSD, wherein each of the plurality of file segments is transferred as a series of sub-segments via the data communications network using a transport layer communication protocol;

determining, by the PMCSD, an actual transfer rate at which the selected file segment was sent from the media content source to the PMCSD based in part on size of the selected file segment and an elapsed time between when the selected file segment was sent from the media content source and when the selected file segment was received at the PMCSD, wherein the transfer of the selected file segment spans a sufficient amount of time to permit a network transfer rate between the media content source and the PMCSD to reach a steady-state;

determining, by the PMCSD, a wait period to avoid congestion based in part on the maximum transfer rate, the actual transfer rate, and network congestion of the data communications network;

after receiving the selected file segment at the PMCSD, waiting the wait period before sending an acknowledgement message from the PMCSD to the media content source, the acknowledgement message acknowledging receipt of the selected file segment by the PMCSD; and sending the acknowledgement message from the PMCSD to the media content source.

17. The networked computer system of claim 1, wherein the at least one media content transfer instruction relates to instructions for existing, partially completed media content transfers.

18. The computer-executable method of claim 11, wherein the at least one media content transfer instruction relates to instructions for existing, partially completed media content transfers.

* * * * *